(12) United States Patent
Watanabe et al.

(10) Patent No.: US 10,534,126 B2
(45) Date of Patent: Jan. 14, 2020

(54) LIGHTING DEVICE AND DISPLAY DEVICE

(71) Applicant: Sharp Kabushiki Kaisha, Sakai, Osaka (JP)

(72) Inventors: Hisashi Watanabe, Sakai (JP); Hirotoshi Yasunaga, Sakai (JP); Youzou Kyoukane, Sakai (JP); Takeshi Ishida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/082,587

(22) PCT Filed: Mar. 10, 2017

(86) PCT No.: PCT/JP2017/009680
§ 371 (c)(1),
(2) Date: Sep. 6, 2018

(87) PCT Pub. No.: WO2017/159556
PCT Pub. Date: Sep. 21, 2017

(65) Prior Publication Data
US 2019/0094448 A1   Mar. 28, 2019

(30) Foreign Application Priority Data

Mar. 18, 2016 (JP) .................... 2016-055629

(51) Int. Cl.
*G02B 6/00* (2006.01)
*F21V 8/00* (2006.01)

(52) U.S. Cl.
CPC ........... *G02B 6/0038* (2013.01); *G02B 6/005* (2013.01)

(58) Field of Classification Search
CPC .. G02B 6/0038; G02B 6/0043; G02B 6/0045; G02B 6/0058
See application file for complete search history.

(56) References Cited

U.S. PATENT DOCUMENTS 7,073,933 B2   7/2006 Gotoh et al.
7,164,842 B2 *  1/2007 Chen .................... G02B 6/0038
                                              362/23.1
(Continued)

FOREIGN PATENT DOCUMENTS

| JP | 2003-215349 A | 7/2003 |
| JP | 2005-108512 A | 4/2005 |
| WO | 2007/132574 A1 | 11/2007 |

OTHER PUBLICATIONS

Official Communication issued in International Patent Application No. PCT/JP2017/009680, dated May 23, 2017.

*Primary Examiner* — Julie A Bannan
(74) *Attorney, Agent, or Firm* — Keating & Bennett, LLP

(57) ABSTRACT

A backlight device 12 includes LEDs 15, a light guide plate 17 having a light entering edge surface 17a opposite the LEDs 15 and having plate surfaces one of which is alight exit plate surface 17b, and a light collecting portion 22 including unit light collecting portions 22a that extend in a normal direction of the light entering edge surface 17a on the light exit plate surface 17b and are arranged in a perpendicular direction perpendicular to the normal direction. The light guide plate 17 includes an opposite edge portion 23 that is opposite from an end portion thereof having the light entering edge surface 17a, the opposite edge portion 23 has an edge surface a part of which is a curved edge surface 24 having a curved planar shape and the opposite edge portion 23 has the light exit plate surface 17b a part of which is a light collecting portion non-forming section 25 on which no light collecting portion 22 is formed.

12 Claims, 21 Drawing Sheets

(56) References Cited

U.S. PATENT DOCUMENTS

| 8,253,883 B2 | 8/2012 | Mimura |
| 2003/0137821 A1 | 7/2003 | Gotoh et al. |
| 2009/0115933 A1 | 5/2009 | Mimura |
| 2012/0063166 A1* | 3/2012 | Panagotacos .......... G02B 6/002 362/609 |

* cited by examiner

LIGHTING DEVICE AND DISPLAY DEVICE

TECHNICAL FIELD

The present invention relates to a lighting device and a display device.

BACKGROUND ART

A liquid crystal display device that is described in Patent Document 1 has been known. The liquid crystal display device described in Patent Document 1 includes a liquid crystal panel including pixels in a display region displaying images and a light-shielding member. The light-shielding member has a light-shielding curve portion where the plane shape is formed of a curve, and the display region has a curved outline formed when the pixels are shielded from light by the light-shielding curve portion.

RELATED ART DOCUMENT

Patent Document 1: International Publication WO 2007/132574

Problem to be Solved by the Invention

A backlight device that provides light to the liquid crystal panel having a curved outline described in Patent Document 1 may preferably have a light ray exit region having a curved outline following the outline of the liquid crystal panel from a view point of design. However, in the backlight device having such a configuration, a bright section in which an amount of exiting light rays is locally increased may be caused due to the curved outline of the light ray exit region.

DISCLOSURE OF THE PRESENT INVENTION

An object of the present invention is to reduce brightness unevenness.

Means for Solving the Problem

A lighting device according to the present invention includes a light source, a light guide plate having a light entering edge surface that is opposite the light source and through which light enters and having a pair of plate surfaces one of which is a light exit plate surface through which the light exits, and a light collecting portion including unit light collecting portions that extend in a normal direction of the light entering edge surface on the light exit plate surface and are arranged in a perpendicular direction perpendicular to the normal direction. The light guide plate includes an opposite edge portion that is opposite from an end portion thereof having the light entering edge surface, the opposite edge portion has an edge surface a part of which is a curved edge surface having a curved planar shape and the opposite edge portion has the light exit plate surface a part of which is a light collecting portion non-forming section on which no light collecting portion is formed.

According to such a configuration, the light rays emitted by the light source enter the light guide plate through the light entering edge surface and travel within the light guide plate and exit through the light exit plate surface. The light rays travelling within the light guide plate and reaching the light exit plate surface are accelerated to exit through the light exit plate surface by the unit light collecting portions of the light collecting portion. When the light rays exit the light guide plate, the light collecting action is selectively applied to the light rays in the arrangement direction of the unit light collecting portions, that is, the perpendicular direction perpendicular to the normal direction of the light entering edge surface. The light rays entering through the light entering edge surface and travelling within the light guide plate toward the opposite edge portion in the normal direction of the light entering edge surface. Then, the light rays are totally reflected by the curved edge surface having a curved plan view shape in the opposite edge portion. The totally reflected light rays are reflected by the curved edge surface at an angle of reflection according to the angle of incident on the curved edge surface, and the totally reflected light rays travel in the direction crossing the normal direction of the light entering edge surface. Therefore, the light rays travelling within the opposite edge portion include the reflected light rays travelling in the direction crossing the normal line in addition to the light rays travelling in the normal line of the light entering edge surface. A greater amount of light rays reach the light exit plate surface of the opposite edge portion compared to other sections of the light exit plate surface. A part of the light exit plate surface of the opposite edge portion is the light collecting portion non-forming section in which no light collecting portion is formed. Therefore, even if the greater amount of light rays reach the light exit plate surface of the opposite edge portion than the other sections as described above, the light rays are less likely to exit through the light exit plate surface. Accordingly, the amount of light rays exiting the opposite edge portion through the light exit plate surface is not excessively increased and brightness unevenness is less likely to be caused in the exiting light rays.

The present invention may further include following configurations.

(1) The curved edge surface of the opposite edge portion may have an arched planar shape having a certain curvature radius. According to such a configuration, the light rays that are totally reflected by the curved edge surface travel in a regular direction. Accordingly, the optical design of the light collecting portion non-forming section is easy.

(2) The curvature radius of the curved edge surface may be referred to as "r" and a critical angle of the light guide plate with respect to air may be referred to as "θ" and a center of curvature of the curved edge surface may be referred to as an original point, and orthogonal coordinates may have a Y-axis passing through the original point and parallel to the normal direction and a X-axis passing through the original point and parallel to the perpendicular direction, and a line may be obtained such that an intercept is "r·sin θ·(1−tan(90°−2θ))" and inclination is "tan(90°−2θ)" and an area defined by the line may be the light collecting portion non-forming section of the opposite edge portion. According to such a configuration, a section of the opposite edge portion through which a great amount of the light rays totally reflected by the curved edge surface pass is the light collecting portion non-forming section. Therefore, brightness of the exiting light rays can be effectively high and brightness unevenness is less likely to be caused. If the refractive index with respect to the light guide plate is "n", the critical angle "θ" of the light guide plate with respect to air is "arcsin(1/n)".

(3) The curvature radius of the curved edge surface may be referred to as "r", and the light collecting portion non-forming section may be included in the opposite edge portion in an area defined by a distance of "r/3 to r" from an opposite edge surface of the light guide plate opposite from the light entering edge surface. If a light collecting portion non-forming section is smaller than an area defined by the distance of "r/3" from the opposite edge surface of the light guide plate, the brightness unevenness caused by the light collecting portion may not be suppressed effectively. If a light collecting portion non-forming section is greater than an area defined by the distance of "r" from the opposite edge surface, the light collecting function of the light collecting portion is lowered and brightness may be lowered. The light collecting portion non-forming section is designed to be in an area defined by the distance of "r/3 to r" from the opposite edge surface of the light guide plate, occurrence of the brightness unevenness is optimally restricted while keeping brightness in the exiting light rays. The shapes of the light collecting portion non-forming section and the light collecting portion are simplified and design and manufacturing of the light guide plate are easy.

(4) The light collecting portion may be disposed such that a border section between the light collecting portion and the light collecting portion non-forming section is formed in a zig-zag shape in a plan view. According to such a configuration, the border section between the light collecting portion and the light collecting portion non-forming section is less likely to be seen and it is preferable for restricting the brightness unevenness compared to a configuration in which the border section between the light collecting portion and the light collecting portion non-forming section is straight in a plan view.

(5) Some of the unit collecting portions of the light collecting portion may reach an opposite edge surface of the light guide plate opposite from the light entering edge surface. According to such a configuration, the light rays near the opposite edge surface within the opposite edge portion are accelerated to exit the light guide plate by the ones of the unit light collecting portions extending to the opposite edge surface. Therefore, brightness is improved near the opposite edge surface.

(6) The unit light collecting portions of the light collecting portion may project from the light exit plate surface with a projected height and the light collecting portion may be formed such that the projected height is decreased as the unit light collecting portions extend toward the light collecting portion non-forming section. According to such a configuration, the border section between the light collecting portion and the light collecting portion non-forming section is less likely to be seen and brightness unevenness is effectively restricted compared to the configuration in which the projected height of the unit light collecting portions from the light exit plate surface is constant over an entire length thereof.

(7) The opposite edge portion may selectively include the light collecting portion non-forming section in a section overlapping the curved edge surface with respect to the perpendicular direction. According to such a configuration, the light collecting portion is disposed in a larger area in the opposite edge portion compared to the configuration including the light collecting portion non-forming area extending over an entire area of the opposite edge portion in the perpendicular direction. Therefore, brightness of the exiting light rays is improved. Sections of the opposite edge portion overlapping the curved edge surfaces with respect to the perpendicular direction are selectively defined as the light collecting portion non-forming sections and the brightness unevenness is effectively suppressed.

(8) Other one of the pair of the plate surfaces of the light guide plate may be an opposite plate surface and the light guide plate may include an exit light reflection portion on the opposite plate surface and the exit light reflection portion may include unit reflection portions that reflect light and accelerate light to exit through the light exit plate surface, and the light exit opposite plate surface of the opposite edge portion may have a section overlapping the light collecting portion non-forming section and the section may be a less exit light reflection section in which a distribution density of the unit reflection portions is low. A greater amount of light rays reaches the light exit plate surface of the opposite edge portion compared to other portions. However, the section of the light exit opposite plate surface of the opposite edge portion overlapping the light collecting portion non-forming section is the less exit light reflection section so that the acceleration of exiting of light rays by the exit light reflection portion is further effectively restricted. Accordingly, brightness unevenness that can be caused in the exiting light rays is effectively restricted.

Next, to solve the above problem, a display device includes the above lighting device and a display panel displaying images using light from the lighting device. According to the display device having such a configuration, brightness unevenness is less likely to be caused in the lighting device that supplies light rays to the display panel and therefore, good display quality is obtained.

Advantageous Effect of the Invention

According to the present invention, brightness unevenness is less likely to be caused.

MODES FOR CARRYING OUT THE INVENTION

First Embodiment

Figure 1:
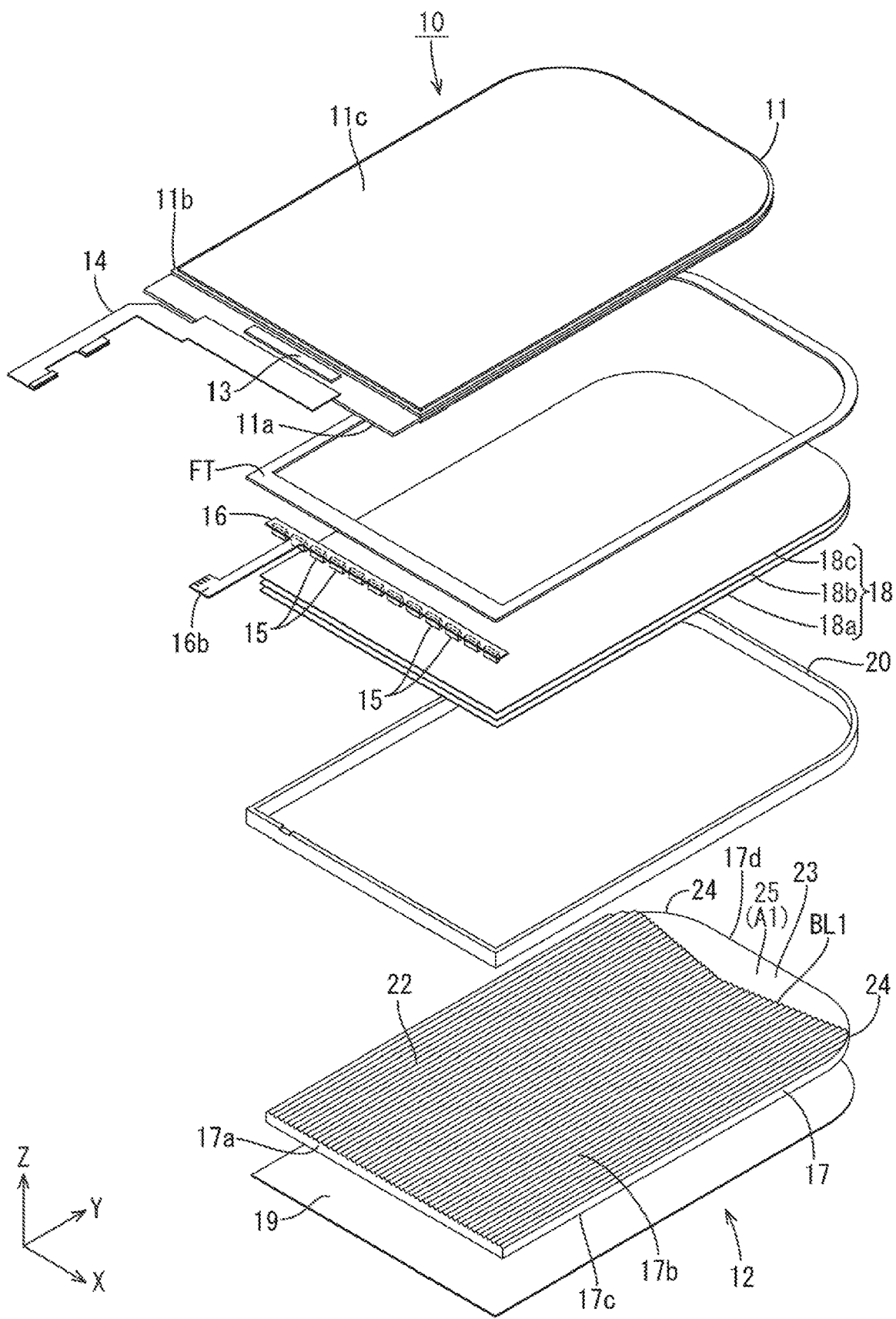
FIG. 1 is an exploded perspective view illustrating a liquid crystal display device according to a first embodiment of the present invention.

A first embodiment of the present invention will be described with reference to FIGS. 1 to 10. In this embodiment section, a liquid crystal display device 10 will be described as an example. X-axis, the Y-axis and the Z-axis may be present in the drawings and each of the axial directions represents a direction represented in each drawing. An upper side and a lower side in FIGS. 2, 3 and 6 correspond to a front side and a back side, respectively.

As illustrated in FIG. 1, the liquid crystal display device 10 has a vertically-elongated rectangular shape as a whole and has an outline such that a pair of corner portions of each end of long sides has an arched shape. The outline of the liquid crystal display device 10 affects the components which will be described below. The liquid crystal display device 10 includes a liquid crystal panel (a display panel) 11 displaying images, a backlight device (a lighting device) 12, and a fixing tape FT fixing the liquid crystal panel 11 and the backlight device 12. The backlight device 12 is an external light source and is disposed on the back side of the liquid crystal panel 11 and light exits the backlight device 12 toward the liquid crystal panel 11. The fixing tape FT has a vertically-elongated frame shape following a frame shape (a non-display section of the liquid crystal panel 11) of the liquid crystal display device 10 and is preferably a light blocking double-sided adhesive tape including a base member having light blocking properties and adhesive member coated on both surfaces of the base member. In the liquid crystal display device 10 and the components having shapes along the outline of the liquid crystal display device 10, a long-side direction matches the Y-axis direction and a short-side direction matches the X-axis direction, and a thickness direction matches the Z-axis direction.

Figure 2:
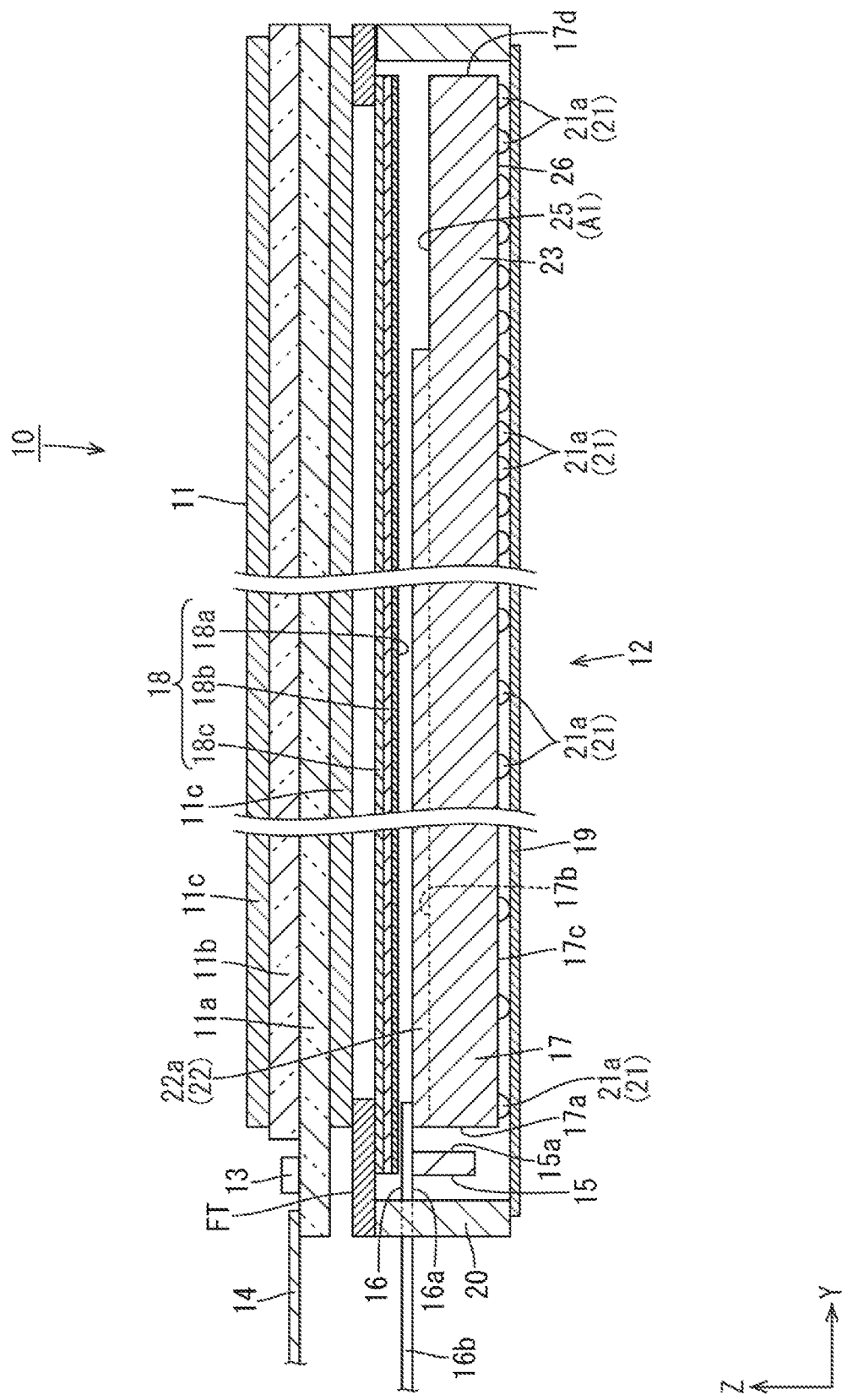
FIG. 2 is a cross-sectional view illustrating the liquid crystal display device cut along a long-side direction thereof.
Figure 3:
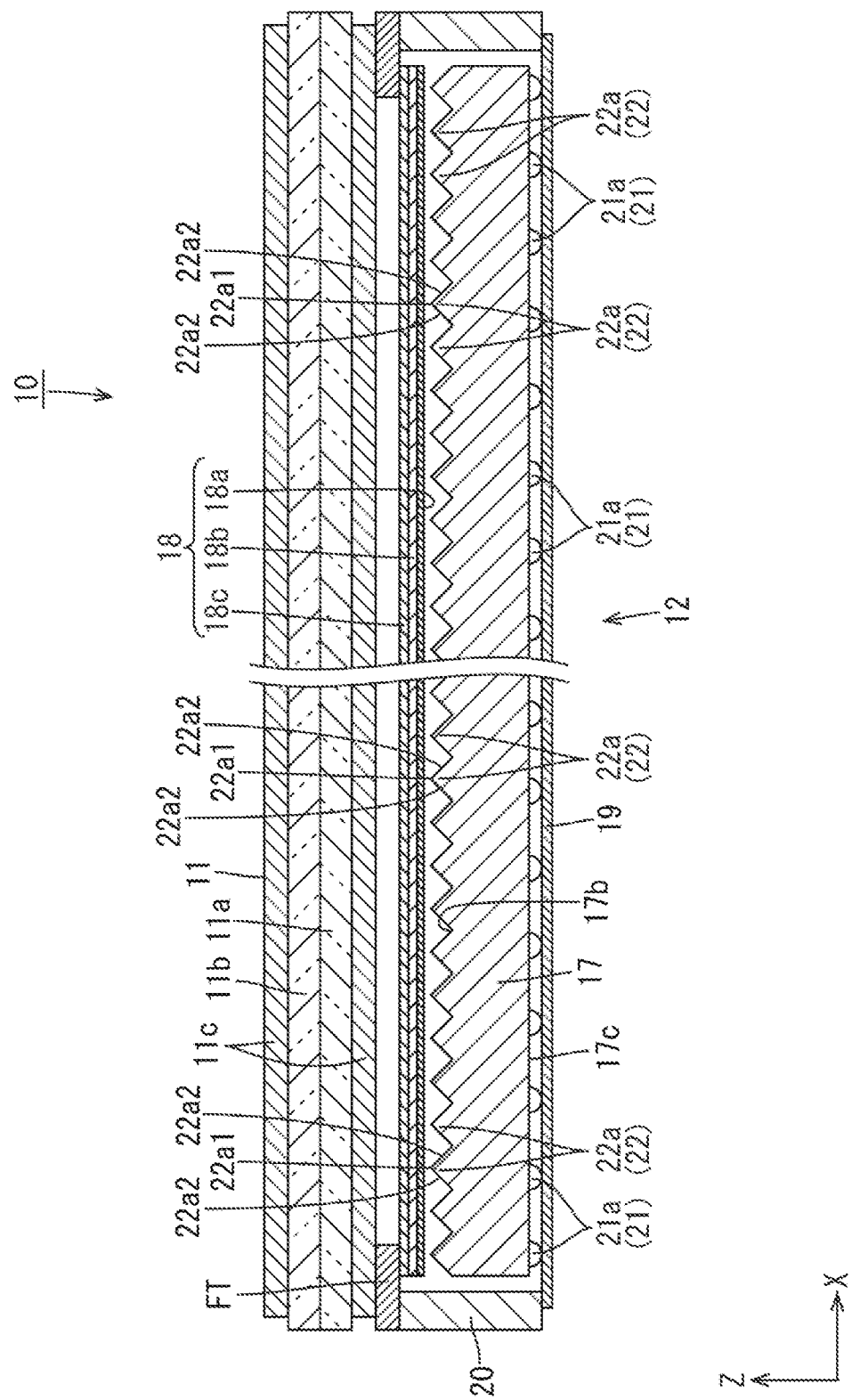
FIG. 3 is a cross-sectional view illustrating the liquid crystal display device cut along a short-side direction thereof.

As illustrated in FIGS. 2 and 3, the liquid crystal panel 11 having a pair of rounded corner portions following the shape of the liquid crystal display device 10 includes a pair of substrates 11a, 11b and liquid crystals between the substrates 11a, 11a. The substrates 11a, 11b are bonded to each other with a predetermined gap and the liquid crystals enclosed therebetween. A back-side one of the substrates 11a, 11b is an array board 11a and switching components (such as TFTs) connected to source lines and gate lines that are perpendicular to each other, pixel electrodes connected to the switching components, and an alignment film are disposed on the array board 11a. A front-side one is a CF board 11b and a color filter including color portions of red (R), green (G), and blue (B) arranged in a predetermined arrangement, counter electrodes, and an alignment film are disposed on the CF board 11b. A flexible printed board 13 and a driver 14 are mounted on the array board 11a. Polarizing plates 11c are attached to the outer surfaces of the substrates 11a and 11b, respectively.

As illustrated in FIG. 1, the backlight device 12 having a pair of rounded corner portions following the shape of the liquid crystal display device 10 at least includes LEDs (light emitting diodes) 15 that are light sources, an LED board (a light source board) 16 on which the LEDs 15 are mounted, a light guide plate 17 that guides light from the LEDs 15, an optical sheet (an optical member) 18 that is disposed on the light guide plate 17 on a front side thereof, a reflection sheet (a reflecting member) 19 that is disposed on the light guide plate 17 on a rear side thereof, and a frame 20 that collectively surrounds the components 15 to 19. The light guide plate 17, the optical sheet 18, the reflection sheet 19, and the frame 20 have a pair of round corner portions following the shape of the liquid crystal display device 10. The backlight device 12 includes the LEDs 15 (the LED board 16) locally near an edge with respect to the long-side direction thereof and having a pair of corner portions that are not round and light enters through one side surface. The backlight device 12 is an edge-light type (a side-light type). Hereinafter, the components of the backlight device 12 will be described sequentially.

As illustrated in FIGS. 1 and 2, the LEDs 15 are mounted on a base board that is fixed on the LED board 16 and the LEDs 15 are configured by enclosing LED chips with resin material on the base board. The LED chips of the LEDs 15 emit single blue light. Phosphors (yellow phosphors, green phosphors, and red phosphors) are dispersed in the resin material with which the LED chips are enclosed and the LEDs 15 emit substantially white light as a whole. The LEDs 15 are side-surface emitting type where side surfaces of the LEDs 15 are light emitting surfaces 15a. The light emitting surfaces 15a of the LEDs 15 are next to the mounting surfaces that are mounted on the LED board 16.

As illustrated in FIGS. 1 and 2, the LED board 16 has a horizontally elongated rectangular shape (a long-side direction matches the X-axis direction and a short-side direction matches the Y-axis direction). The LED board 16 is arranged such that a plate surface thereof is parallel to a plate surface of the light guide plate 17 and a rear side plate surface of the LED board 16 is an LED mounting surface (a light source mounting surface) 16a on which the LEDs 15 are mounted. A tracing pattern (not illustrated) through which power is supplied to the LEDs 15 are formed with patterning on the LED mounting surface 16a and the LEDs 15 are arranged at intervals in the X-axis direction. The LED board 16 is disposed on a front side with respect to the frame 20 and the light guide plate 17 and is sandwiched between the liquid crystal panel 11 and each of the frame 20 and the light guide plate 17. The LED board 16 includes an extended line portion 16b extended outside the frame 20 from a main portion thereof (on which the LEDs 15 are mounted).

The light guide plate 17 is made of synthetic resin that is substantially transparent (acrylic resin such as PMMA or polycarbonate). The light guide plate 17 has refractive index greater than air. Specifically, the light guide plate 17 made of acrylic resin has refractive index of about 1.49 and that made of polycarbonate has refractive index of about 1.57. As illustrated in FIGS. 1 and 2, the light guide plate 17 is arranged directly below the liquid crystal panel 11 and the optical sheet 18 while being surrounded by the frame 20. Among outer peripheral edge surfaces of the light guide plate 17, a left short-side edge surface in FIG. 2 is opposite the LEDs 15 and is a light entering edge surface (a light source opposite edge surface) 17a through which light from the LEDs 15 enters, and another short-side edge surface (a left side in FIG. 2) is an opposite edge surface (light source non-opposite edge surface) 17d. The light guide plate 17 has a pair of plate surfaces on a front side and a rear side and one of the plate surfaces facing the front side is a light exit plate surface 17b through which light exits toward the liquid crystal panel 11 and another one facing the rear side is a light exit opposite plate surface 17c that is an opposite surface from the light exit plate surface 17b. According to such a configuration, the light emitted by the LEDs 15 in the Y-axis direction enters the light guide plate 17 through the light entering edge surface 17a and travels within the light guide plate 17. Then, the light is directed in the Z-axis direction and exits the light guide plate 17 through the light exit plate surface 17b toward the optical sheet 18 (the front side, the light exit side).

As illustrated in FIGS. 1 and 2, the optical sheet 18 is arranged such that a plate surface thereof is parallel to a plate surface of the light guide plate 17 and is between the liquid crystal panel 11 and the light guide plate 17 with respect to the Z-axis direction. Accordingly, the optical sheet 18 changes optical properties of light that exits the light guide plate 17 and enters and passes the optical sheet 18 and the light exits the optical sheet 18 toward the liquid crystal panel 11. The optical sheet 18 includes multiple sheets (three sheets in this embodiment) that are layered on each other and includes a diffuser sheet 18a, a first prism sheet 18b, and a second prism sheet 18c in this order from the rear side. The first prism sheet 18b and the second prism sheet 18c are preferably arranged such that extending directions of them are perpendicular to each other. The fixing tape FT is put on a front surface of an outer peripheral edge portion of the second prism sheet 18c that is on a most upper side. Specifically, the adhesive member on a back side surface of the fixing tape FT is bonded on the front surface of the second prism sheet 18c. "D114" made by TSUJIDEN Co., Ltd. may be preferably used as the diffuser sheet 18a. "BEF series" made by 3M Japan may be preferably used as the first prism sheet 18b and the second prism sheet 18c. However, it is not limited thereto.

As illustrated in FIGS. 1 and 2, the reflection sheet 19 has a plate surface that is parallel to the plate surface of the light guide plate 17 and covers the light exit opposite plate surface 17c of the light guide plate 17. The reflection sheet 19 has good light reflectivity and light leaking from the light guide plate 17 through the light exit opposite plate surface 17c reflects off the reflection sheet 19 and is effectively directed toward a front side (the light exit plate surface 17b). The reflection sheet 19 has an outline that is slightly greater than that of the light guide plate 17 and has an edge portion with respect to the long side thereof that extends from the light entering edge surface 17a toward the LEDs 15. The reflection sheet 19 is preferably fixed to the frame 20 with a double-sided adhesive tape, which is not illustrated. "ESR" made by 3M Japan is preferably used as the reflection sheet 19. However, it is not limited thereto.

The frame 20 is made of synthetic resin having a surface exhibiting white (such as polycarbonate) and as illustrated in FIGS. 1 and 2, the frame 20 has an outline slightly greater than that of the light guide plate 17. The frame 20 is arranged to surround collectively the LEDs 15 and the light guide plate 17. The fixing tape FT having a light blocking property is bonded on the front surface of the frame 20 with the adhesive material on the back surface of the fixing tape FT. Accordingly, the frame 20 is fixed to the liquid crystal panel 11 with the fixing tape FT.

The light guide plate 17 will be described more in detail. As illustrated in FIG. 2, the light guide plate 17 includes an exit light reflection portion 21 that reflects the light rays travelling within the light guide plate 17 and accelerates the light rays to exit through the light exit plate surface 17b. The exit light reflection portion 21 includes multiple unit reflection portions (light reflection dots) 21a that are printed on the light exit opposite plate surface 17c (such as printing with a dispenser, printing with ink jetting, and printing with a screen plate). A distribution density of the unit reflection portions is changed according to a distance from the light entering edge surface 17a (the LEDs 15). Specifically, the distribution density of the unit reflection portions 21a of the exit light reflection portion 21 is increased as the unit reflection portions 21a are farther from the light entering edge surface 17a and the distribution density is decreased as the unit reflection portion 21a are closer to the light entering edge surface 17a. Accordingly, the light rays exiting through the light exit plate surface 17b are at substantially even distribution within a surface area of the light exit plate surface 17b.

As illustrated in FIG. 3, the light guide plate 17 includes a light collecting portion (a prism portion) 22 on the light exit plate surface 17b and the light collecting portion 22 applies the light collecting action to the light transmitting therethrough. The light collecting portion 22 includes unit light collecting portions (unit prisms) 22a that project from the light exit plate surface 17b toward the front side (toward the optical sheet 18) in the Z-axis direction. The unit light collecting portion 22a has a cross-sectional mountain shape cut along the X-axis direction (a perpendicular direction perpendicular to a normal direction of the light entering edge surface 17a). The unit light collecting portion 22a extends linearly along the Y-axis direction (a normal direction of the light entering edge surface 17a). The unit light collecting portions 22a are arranged in the X-axis direction on the light exit plate surface 17b without having a space therebetween. Each of the unit light collecting portions 22a has a triangular cross-sectional shape and includes a top portion 22a1 and a pair or sloped surfaces 22a2 having the top portion 22a1 therebetween. According to the unit light collecting portions 22a, when the light travelling within the light guide plate 17 exits the light guide plate 17, the light is refracted at a border surface of an external air layer and each sloped surface 22a2 of the unit light collecting portions 22a so that the light is directed almost in a front direction (a normal direction of the light exit plate surface 17b). Such a light collecting action acts on the light entering the unit light collecting portions 22a in the X-axis direction and is less likely to act on the light entering the unit light collecting portions 22a in the Y-axis direction that is perpendicular to the X-axis direction. Therefore, in the light collecting portion 22 of this embodiment, the X-axis direction that is an arrangement direction of the unit light collecting portions 22a is a light collecting direction in which the light collecting action is applied to the light and the Y-axis direction that is an extending direction of each unit light collecting portion 22a is a non-light collecting direction in which the light collecting action is less likely to be applied to the light. The unit light collecting portion 22a has a pair of sloped surfaces 22a2 and therefore, some of the light rays travelling within the light guide plate 17 and reaching the light exit plate surface 17b may likely have an angle of incident on the sloped surface 22a2 that is not greater than the critical angle, and such light rays exit through the light exit plate surface 17b. Namely, the unit light collecting portions 22a of the light collecting portion 22 have a function of accelerating light rays reaching the light exit plate surface 17b to exit the light guide plate 17. The unit light collecting portion 22a preferably has an apex angle of about 90 degrees and an interval between the unit light collecting portions 22a is preferably about 30 μm. However, it is not limited thereto.

Figure 4:
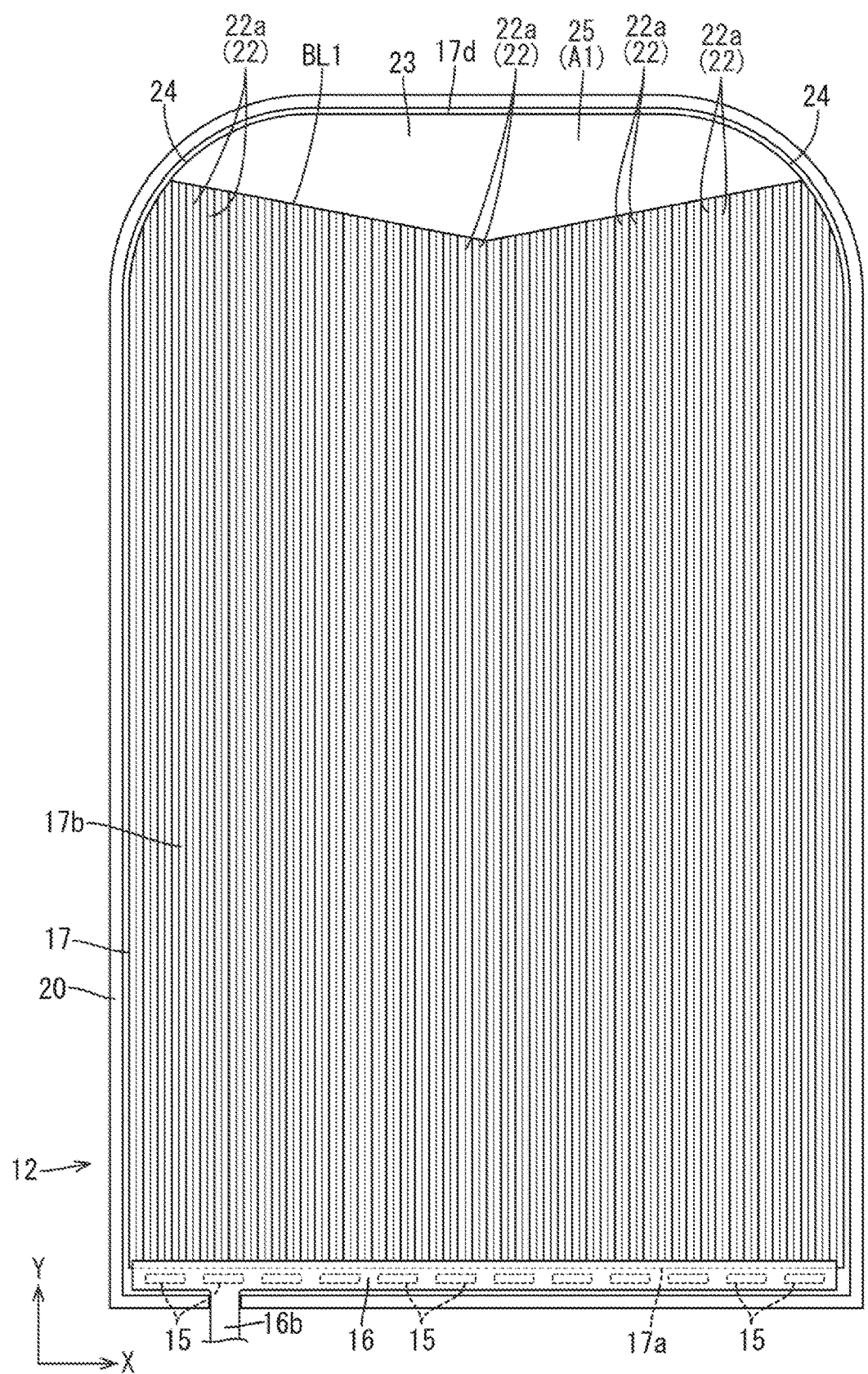
FIG. 4 is a plan view illustrating a backlight device included in the liquid crystal display device.
Figure 7:
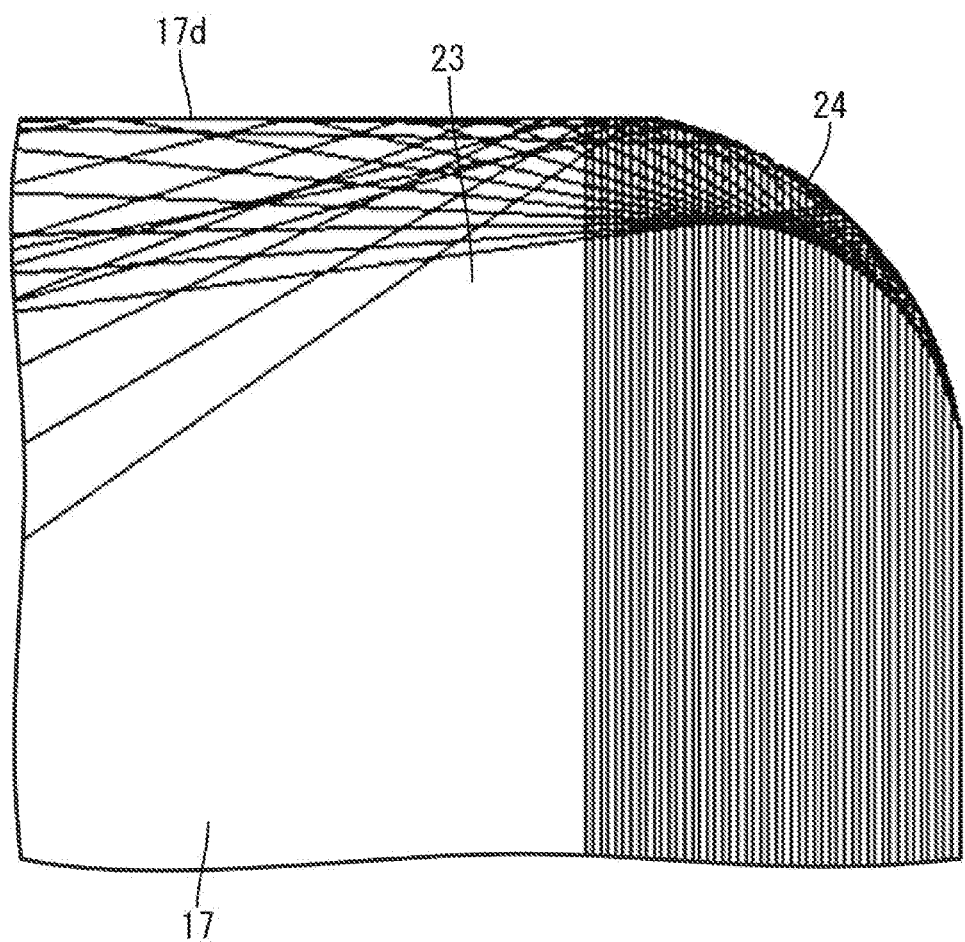
FIG. 7 is a plan view of a light guide plate illustrating light rays tracing results of light rays travelling within the light guide plate.

As illustrated in FIG. 4, the light guide plate 17 has an opposite edge portion 23 that is opposite from the light entering edge surface 17a (the LED 15 side) and the opposite edge portion 23 has a pair of corner portions that are formed in an arched shape following the outline of the backlight device 12. Accordingly, the light guide plate 17 has an outer edge surface a part of which includes a pair of curved edge surfaces 24. The curved edge surface 24 has a curvature radius (about 5 mm, for example) so as to be formed in a certain arched shape in a plan view and has a central angle of about 90°. According to the configuration of the opposite edge portion 23 having such a curved edge surface 24, some of the light rays entering through the light entering edge surface 17a and travelling within the light guide plate 17 substantially straight along the Y-axis direction may reach the curved edge surface 24 and may be totally reflected by the curved edge surface 24. As illustrated in FIG. 7, the light rays totally reflected by the curved edge surface 24 are reflected at a reflection angle corresponding to an angle of incident on the curved edge surface 24 and therefore, the totally reflected light rays travel in an oblique direction crossing the Y-axis direction or in substantially the X-axis direction (a perpendicular direction perpendicular to the normal direction). Therefore, the light rays travelling within the opposite edge portion 23 include the reflected light rays travelling in the oblique direction crossing the Y-axis direction and the reflected light rays travelling in the substantially X-axis direction in addition to the light rays travelling in the Y-axis direction. Therefore, a greater amount of light rays reach the light exit plate surface 17b of the opposite edge portion 23 compared to the amount of light rays reaching a portion of the light exit plate surface 17b other than the opposite edge portion 23. If the light collecting portion 22 is formed over an entire area of the light exit plate surface 17b of the opposite edge portion 23, the reflected light rays travelling in the oblique direction and the reflected light rays travelling in substantially the X-axis direction enter the light collecting portion 22 and most of the reflected light rays enter the unit light collecting portions 22a at an angle of incident on the sloped surface 22a2 not greater than the critical angle. Therefore, most of the reflected light rays exit outside toward the front side and the bright portion may be locally generated near the curved edge surface 24. Such a bright portion is generated because the reflected light rays travelling in the oblique direction or the reflected light rays travelling in substantially the X-axis direction enter the light collecting portion 22 extending in the Y-axis direction.

Figure 5:
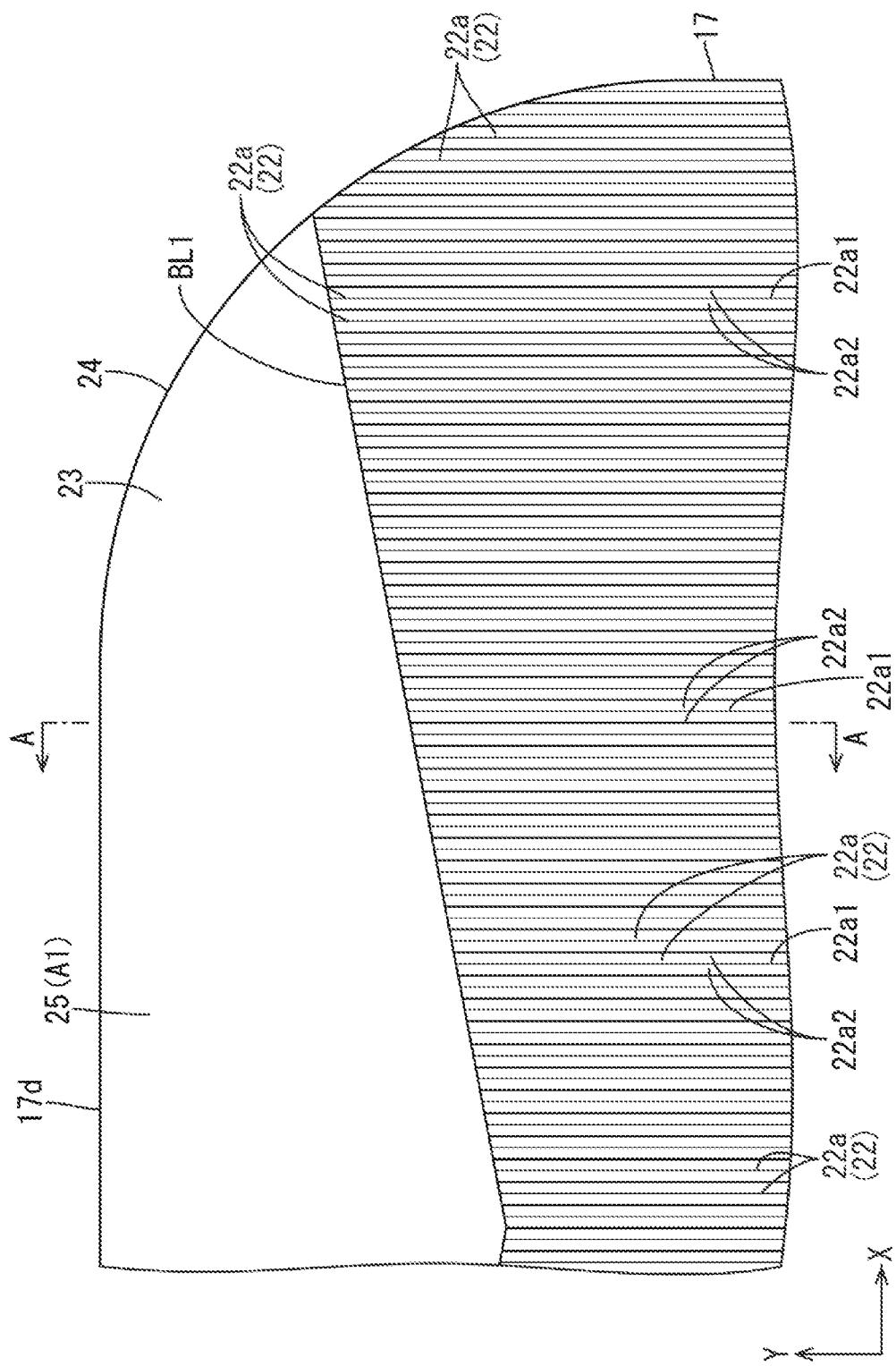
FIG. 5 is a plan view illustrating a portion of the light guide plate included in the backlight device near an opposite edge portion.
Figure 6:
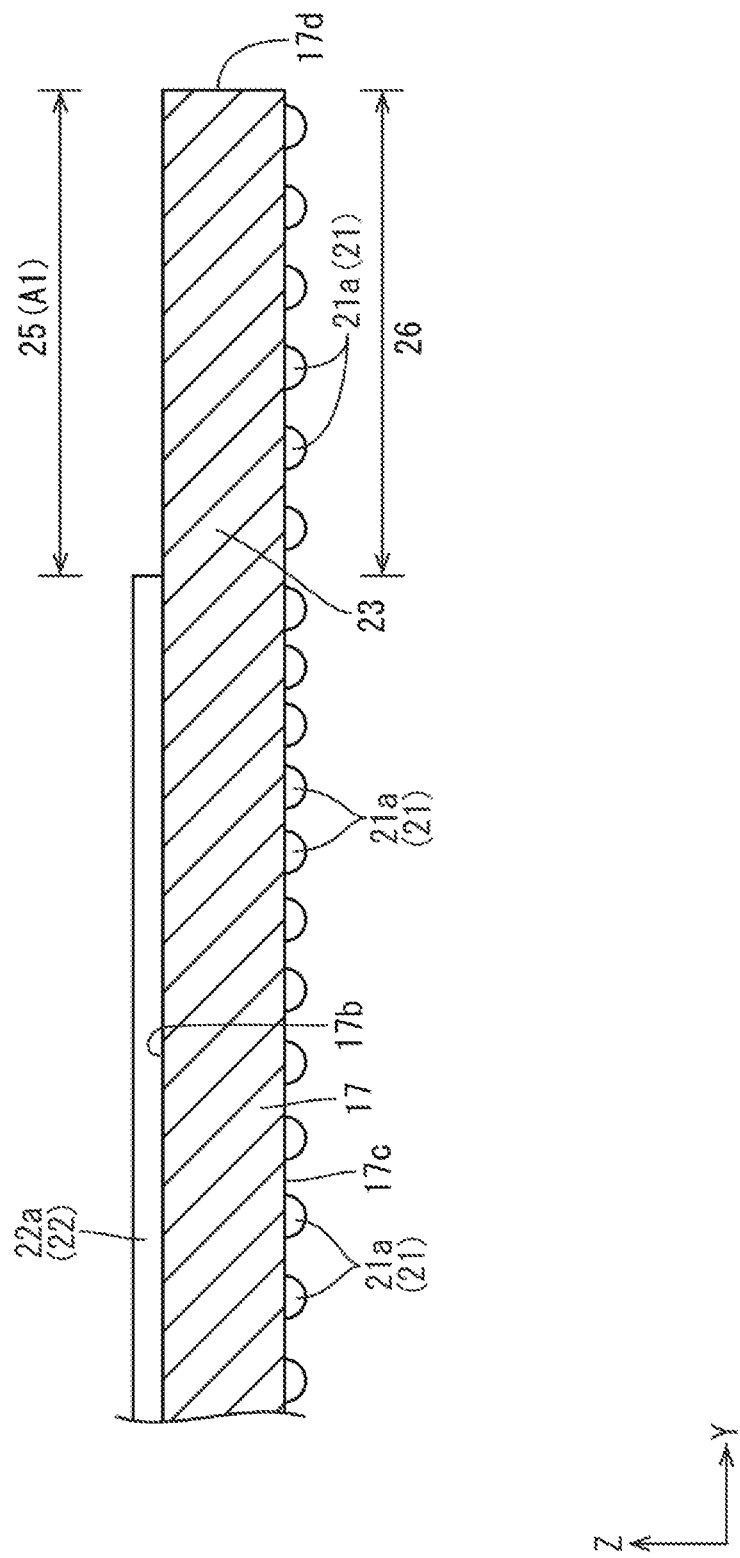
FIG. 6 is a cross-sectional view taken along line A-A in FIG. 5.

As illustrated in FIGS. 5 and 6, the light guide plate of this embodiment includes a light collecting portion non-forming section 25 on which no light collecting portion 22 is formed. A part of the light exit plate surface 17b of the opposite edge portion 23 is the light collecting portion non-forming section 25. There is no projections or recesses macroscopically in the light collecting portion non-forming section 25 of the light exit plate surface 17b of the opposite edge portion 23 (except for quite small roughness) and the light collecting portion non-forming section 25 has substantially a flat surface. Such a light collecting portion non-forming section 25 is included in the light exit plate surface 17b of the opposite edge portion 23 and therefore, even if a greater amount of light rays reach the light exit plate surface 17b of the opposite edge portion 23 than other portions, the light exit accelerating function by the light collecting portion 22 is not exerted in the light collecting portion non-forming section 25. Therefore, light is less likely to exit through the light exit plate surface 17b. Namely, even if the reflected light rays travelling in the oblique direction or the reflected light rays travelling in the substantially X-axis direction reach the light exit plate surface 17b of the opposite edge portion 23, the portion of the light exit plate surface 17b where the reflected light rays reach is the light collecting portion non-forming section 25 that has no light collecting portion extending in the Y-axis direction and is a substantially flat plate surface. Therefore, the light rays reaching the light exit plate surface 17b are totally reflected by the light exit plate surface 17b and travel within the light guide plate 17. Therefore, the light is less likely to exit through the light exit plate surface 17b compared to a configuration including the light collecting portion 22 on the opposite edge portion 23. According to such a configuration, the amount of light rays exiting through the light exit plate surface 17b of the opposite edge portion 23 is less likely to be excessively large and a bright portion is less likely to be locally generated and brightness unevenness is less likely to be caused in the exit light rays. Furthermore, the curved edge surface 24 of the opposite edge portion 23 has a curvature radius so as to be formed in a certain arched shape and therefore, the light rays that are totally reflected by the curved edge surface 24 travel in a regular direction. Accordingly, the optical design is easy. For example, the forming area in which the light collecting portion non-forming section 25 is formed can be determined easily.

Figure 8:
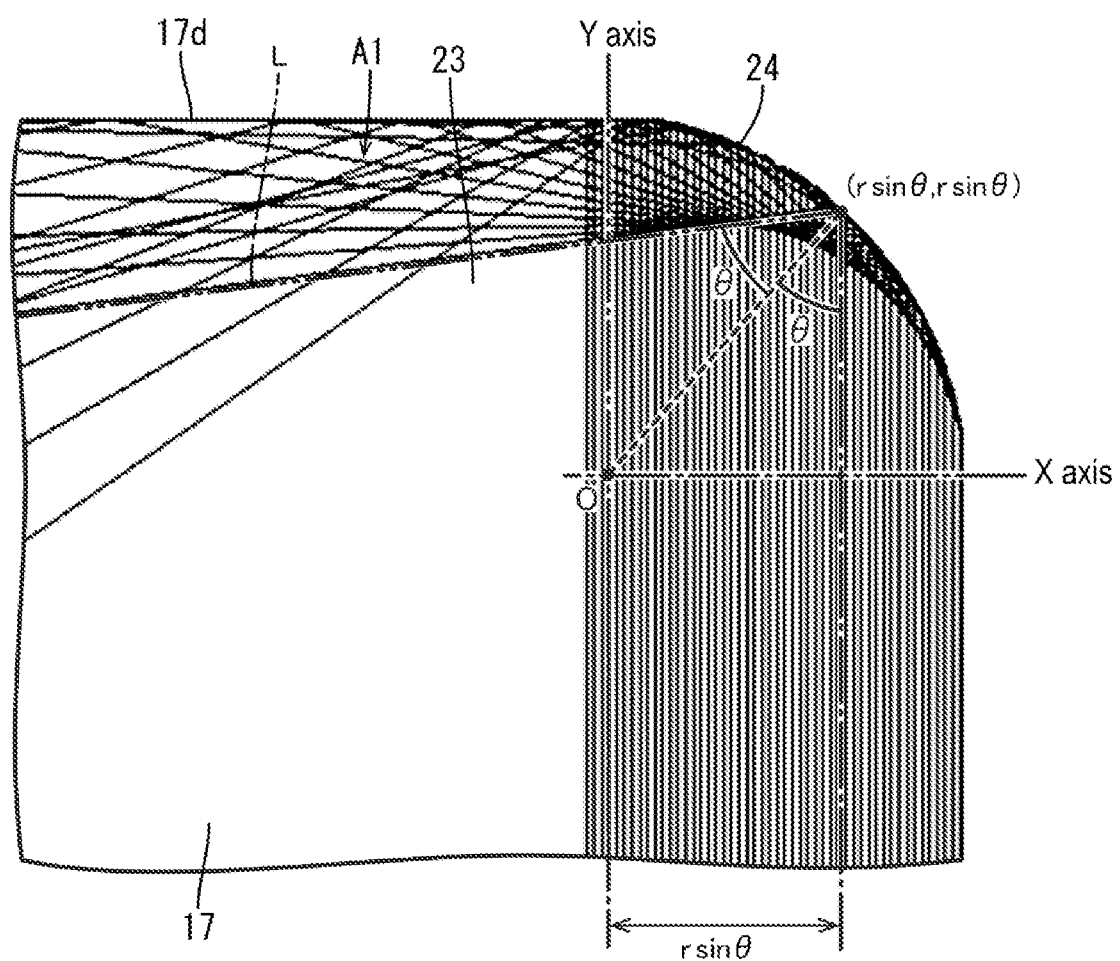
FIG. 8 is a plan view of the light guide plate for explaining a method of designing a light collecting portion non-forming section.

Specifically, the forming area of the light collecting portion non-forming section 25 on the light exit plate surface 17b of the opposite edge portion 23 is designed as described below. A curvature radius of the curved edge surface 24 is referred to as "r" and a critical angle of the light guide plate 17 with respect to air is referred to as "θ". If the refractive index with respect to the light guide plate 17 is "n", the critical angle "θ" with respect to the light guide plate 17 is "arcsin (1/n)". Specifically, if the material of the light guide plate 17 is acrylic resin, n is 1.49 and θ is approximately 42.2°. If the material of the light guide plate 17 is polycarbonate, n is 1.57 and θ is approximately 39.6°. As illustrated in FIG. 8, if a center of curvature of the curved edge surface 24 is referred to as an original point O and orthogonal coordinates have the Y-axis passing through the original point O and parallel to a normal direction of the light entering edge surface 17a (the Y-axis direction) and the X-axis passing through the original point O and parallel to a perpendicular direction perpendicular to the normal direction of the light entering edge surface 17a (the X-axis direction), a line L is obtained such that an intercept is "r·sin θ·(1−tan(90°−2θ))" and inclination is "tan(90°−2θ)" and an area defined by the line L is the light collecting portion non-forming section 25. In FIG. 8, in addition to the light rays tracing results same as those in FIG. 7, the X-axis and the Y-axis of the orthogonal coordinates are illustrated with chain lines and the line L is illustrated with a two-dotted chain line. The line L matches the light path of the reflected light rays that are totally reflected by the curved edge surface 24 at the coordinate position of (r·sin θ, r·sin θ) with respect to the original point O of the orthogonal coordinates. A section A1 that is on the opposite edge surface 17d side (on an opposite side from the light entering edge surface 17a side) from the line L with respect to the Y-axis direction is a reflected light rays concentrated section A1 through which most of the light rays that are totally reflected by the curved edge surface 24 and travel in the oblique direction crossing the normal direction of the light entering edge surface 17a or the X-axis direction pass. According to this embodiment, an entire area of the reflected light rays concentrated section A1 is the light collecting portion non-forming section 25 and therefore, the brightness of the exiting light rays can be ensured at most and occurrence of brightness unevenness can be restricted most effectively. The forming area of the light collecting portion non-forming section 25 having such a design is continuously and gradually increased with respect to the Y-axis direction as is closer to the middle of the opposite edge portion 23 from the edges with respect to the X-axis direction. A border line BL1 (a line obtained by connecting edge surfaces of the unit light collecting portions 22a opposite from the light entering edge surface 17a) between the light collecting portion non-forming section 25 and the light collecting portion 22 forms a shallow V-shape (see FIG. 4).

Furthermore, as illustrated in FIG. 6, the light exit opposite plate surface 17c of the opposite edge portion 23 has a section overlapping the light collecting portion non-forming section 25 as is formed described above and the overlapping section is a less exit light reflection section 26 in which a distribution density of the unit reflection portions 21a of the exit light reflection portion 21 is low. Specifically, as described before, the exit light reflection portion 21 is designed such that the distribution density of the unit reflecting portions 21a is increased as is farther away from the light entering edge surface 17a with respect to the Y-axis direction. However, the distribution density of the unit reflection portions 21a is exceptionally low in the less exit light reflection section 26 of the opposite edge portion 23 compared to that of a section on the light entering edge surface 17a side from the less exit light reflection section 26 with respect to the Y-axis direction. Thus, the less exit light reflection section 26 overlapping the light collecting portion non-forming section 25 is formed on the light exit opposite plate surface 17c of the opposite edge portion 23. According to such a configuration, even if the amount of light rays travelling in the oblique direction crossing the normal direction of the light entering edge surface 17a or the X-axis direction (the perpendicular direction perpendicular to the normal direction) is greater within the opposite edge portion than the amount of light rays travelling within other portion, the acceleration of exiting of the light rays by the light collecting portion is restricted and the acceleration of exiting of the light rays of the exit light reflection portion 21 is restricted. Therefore, brightness unevenness is less likely to be caused in the light rays exiting through the light exit plate surface 17b.

Figure 9:
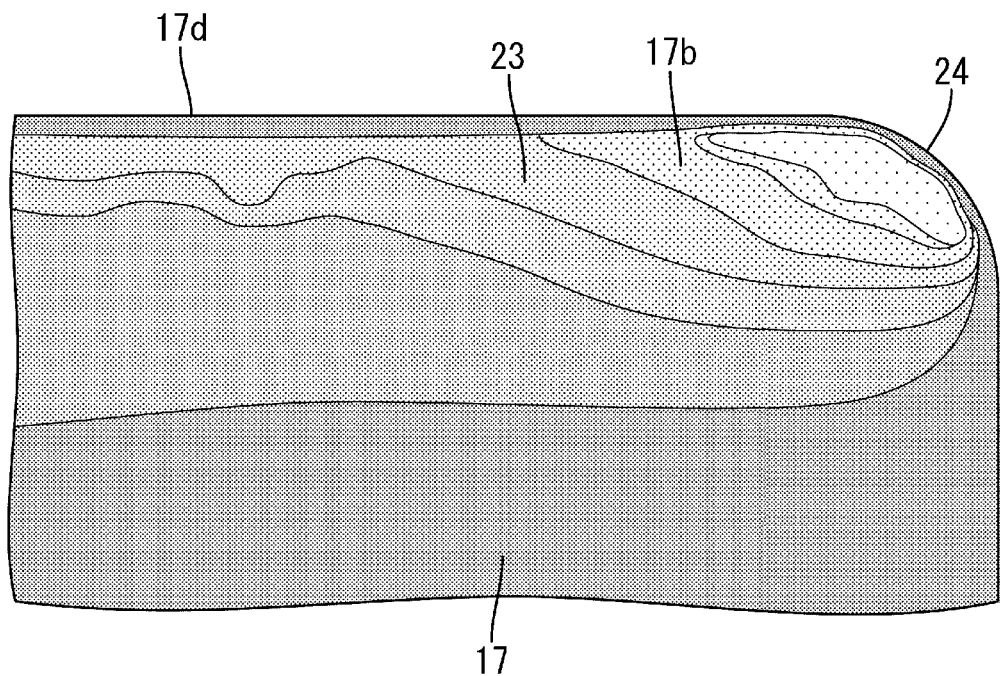
FIG. 9 is a photograph illustrating an experimental result of Comparative Example of Comparative Experiment.
Figure 10:
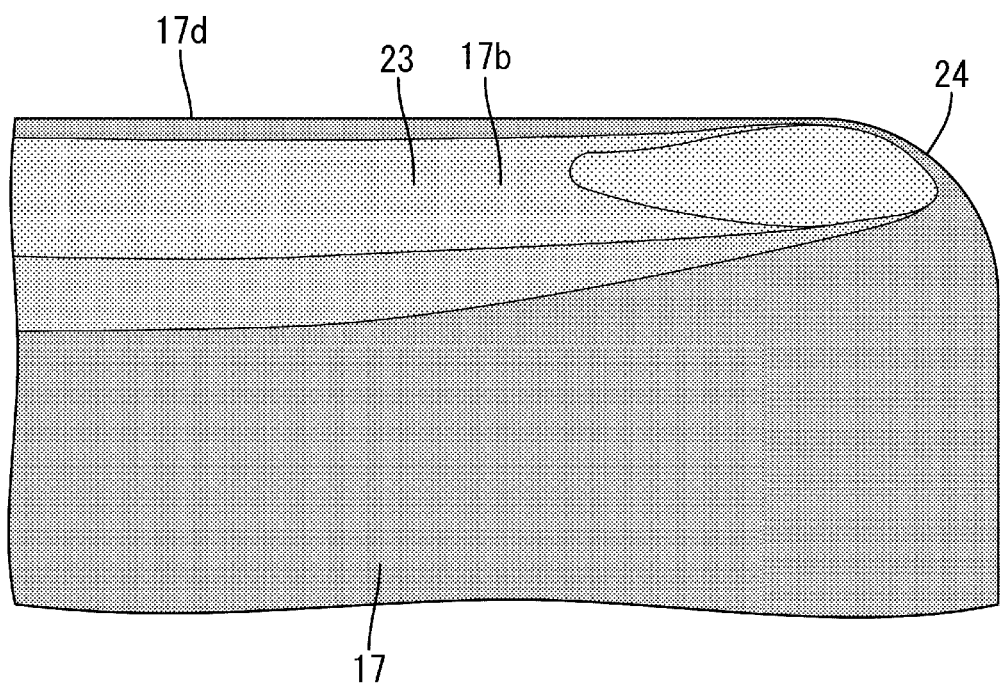
FIG. 10 is a photograph illustrating an experimental result of Example of Comparative Experiment.

To demonstrate the above-described operations and effects, following Comparative Experiments were made. Comparative Experiments include Comparative Example and Example. In Comparative Example, the backlight device includes the light collecting portion over an entire area of the light exit plate surface and the light guide plate that is designed such that the distribution density of the unit reflection portions is increased on the light exit opposite plate surface 17c without exception as the exit light reflection portion is farther away from the light entering edge surface. In Example, the backlight device 12 includes the light guide plate 17 described prior to this paragraph. The backlight device according to Comparative Example is substantially similar to the backlight device 12 of Example except for the configuration of the light guide plate and a pair of corner sections are formed in an arched shape. When the LEDs of each of the backlight devices of Comparative Example and Example is lighted on, a brightness distribution within a plane surface of the light exit plate surface of the opposite edge portion of the light guide plate is measured. Experimental results of Comparative Experiment are illustrated in FIGS. 9 and 10. In FIGS. 9 and 10, a density of dots is varied according to a level of the brightness that is the amount of light rays per a unit area of the light exit plate surface of the opposite edge portion. The brightness is lower as the density of the dots is increased, and the brightness is higher as the density of the dots is lowered. The light guide plate illustrated in FIG. 9 is the one according to Comparative Example, however, symbols same as those of the light guide plate 17 according to this embodiment are used for the light guide plate in FIG. 9 for simplifying the description.

The experimental results of Comparative Experiment will be described. As illustrated in FIG. 9, in the backlight device according to Comparative Example, the amount of rays of exiting light is locally great in a section of the light exit plate surface 17b of the opposite edge portion 23 near the curved edge surface 24 and a bright portion is generated in the section. Such a bright portion is generated because the light rays within the opposite edge portion 23 include a great amount of light rays that are totally reflected by the curved edge surface 24 and travel in the oblique direction crossing the Y-axis direction or travel in the substantially X-axis direction. The light rays are accelerated to exit through the sloped surfaces of the unit light collecting portions of the light collecting portion. Thus, it is presumed that the bright portion is generated. As illustrated in FIG. 10, in the backlight device 12 of Example, the amount of exiting light is slightly greater in the section of the light exit plate surface 17b of the opposite edge portion 23 near the curved edge surface 24 than other section thereof, however, the amount of exiting light near the curved edge surface 24 is not extremely great and it can be said that brightness evenness is effectively obtained. Reasons of effectively obtaining the brightness evenness may be presumed as follows. Even if the light rays within the opposite edge portion 23 include a great amount of the light rays that are totally reflected by the curved edge surface 24 and travel in the oblique direction crossing the Y-axis direction or in the substantially X-axis direction, the light collecting portion non-forming section 25 included in the light exit plate surface 17b may restrict the acceleration of exiting of light by the light collecting portion 22 and the less exit light reflection section 26 included in the light exit opposite plate surface 17c may restrict the acceleration of exiting of light by the light reflection portion 21.

As described before, the backlight device (the lighting device) 12 of this embodiment includes the LEDs (the light source) 15, the light guide plate 17, the light collecting portion 22, and the opposite edge portion 23. The light guide plate 17 includes the light entering edge surface 17a that is opposite the LEDs 15 and through which light enters the light guide plate 17. The light guide plate 17 further includes a pair of plate surfaces one of which is the light exit plate surface 17b through which light exits. The light collecting portion 22 includes the unit light collecting portions 22a that extend in the normal direction of the light entering edge surface 17a on the light exit plate surface 17b and are arranged in the perpendicular direction that is perpendicular to the normal direction. The opposite edge portion 23 is an edge portion of the light guide plate 17 opposite from the light entering edge surface 17a and a part of an edge surface thereof is the curved edge surface 24 having a curved plan view shape. A part of the light exit plate surface 17b of the opposite edge portion 23 is the light collecting portion non-forming section 25 in which no light collecting portion 22 is formed.

According to such a configuration, the light rays emitted by the LEDs 15 enter the light guide plate 17 through the light entering edge surface 17a and travel within the light guide plate 17 and exit through the light exit plate surface 17b. The light rays travelling within the light guide plate 17 and reaching the light exit plate surface 17b are accelerated to exit through the light exit plate surface 17b by the unit light collecting portions 22a of the light collecting portion 22. When the light rays exit the light guide plate 17, the light collecting action is selectively applied to the light rays in the arrangement direction of the unit light collecting portions 22a, that is, the perpendicular direction perpendicular to the normal direction of the light entering edge surface 17a. The light rays entering through the light entering edge surface 17a and travelling within the light guide plate 17 toward the opposite edge portion 23 in the normal direction of the light entering edge surface 17a. Then, the light rays are totally reflected by the curved edge surface 24 having a curved plan view shape in the opposite edge portion 23. The totally reflected light rays are reflected by the curved edge surface 24 at an angle of reflection according to the angle of incident on the curved edge surface 24, and the totally reflected light rays travel in the direction crossing the normal direction of the light entering edge surface 17a. Therefore, the light rays travelling within the opposite edge portion 23 include the reflected light rays travelling in the direction crossing the normal line in addition to the light rays travelling in the normal line of the light entering edge surface 17a. A greater amount of light rays reach the light exit plate surface 17b of the opposite edge portion 23 compared to other sections of the light exit plate surface 17b. A part of the light exit plate surface 17b of the opposite edge portion 23 is the light collecting portion non-forming section 25 in which no light collecting portion 22 is formed. Therefore, even if the greater amount of light rays reach the light exit plate surface 17b of the opposite edge portion 23 than the other sections as described above, the light rays are less likely to exit through the light exit plate surface 17b. Accordingly, the amount of light rays exiting the opposite edge portion 23 through the light exit plate surface 17b is not excessively increased and brightness unevenness is less likely to be caused in the exiting light rays.

The curved edge surface 24 of the opposite edge portion 23 has a curvature radius so as to be formed in a certain arched shape and therefore, the light rays that are totally reflected by the curved edge surface 24 travel in a regular direction. Accordingly, the optical design of the light collecting portion non-forming section 25 is easy.

The curvature radius of the curved edge surface 24 is referred to as "r" and the critical angle of the light guide plate 17 with respect to air is referred to as "θ". If a center of curvature of the curved edge surface 24 is referred to as the original point O and orthogonal coordinates have the Y-axis passing through the original point O and parallel to the normal direction and the X-axis passing through the original point O and parallel to the perpendicular direction, the line L is obtained such that an intercept is "r·sin θ·(1−tan (90°−2θ)" and inclination is "tan(90°−2θ)" and an area defined by the line L is the light collecting portion non-forming section 25. According to such a configuration, a section of the opposite edge portion 23 through which a great amount of the light rays totally reflected by the curved edge surface 24 pass is the light collecting portion non-forming section 25. Therefore, brightness of the exiting light rays can be effectively high and brightness unevenness is less likely to be caused. If the refractive index with respect to the light guide plate 17 is "n", the critical angle "θ" of the light guide plate 17 with respect to air is "arcsin(1/n)".

The other one of the pair of plate surfaces of the light guide plate 17 is the light exit opposite plate surface 17c. The light guide plate 17 includes the exit light reflection portion 21 including the unit reflection portions 21a on the light exit opposite plate surface 17c. The exit light reflection portion 21 reflects the light rays to accelerate the light rays to exit through the light exit plate surface 17b. The light exit opposite plate surface 17c of the opposite edge portion 23 has a section overlapping the light collecting portion non-forming section 25 and the overlapping section is a less exit light reflection section 26 in which a distribution density of the unit reflection portions 21a of the exit light reflection portion 21 is low. A greater amount of light rays reaches the light exit plate surface 17b of the opposite edge portion 23 compared to other portions. However, the section of the light exit opposite plate surface 17c of the opposite edge portion 23 overlapping the light collecting portion non-forming section 25 is the less exit light reflection section 26 so that the acceleration of exiting of light rays by the exit light reflection portion 21 is further effectively restricted. Accordingly, brightness unevenness that can be caused in the exiting light rays is effectively restricted.

The liquid crystal display device (the display device) 10 according to this embodiment includes the above-described backlight device 12 and the display panel displaying images with the light rays from the backlight device 12. According to the display device having such a configuration, brightness unevenness is less likely to be caused in the backlight device 12 that supplies light rays to the display panel and therefore, good display quality is obtained.

Second Embodiment

A second embodiment of the present invention will be described with reference to FIGS. 11 and 12. In the second embodiment, a forming area of a light collecting portion non-forming section 125 is altered. The configurations, operations, and effects that are similar to those in the first embodiment will not be described.

Figure 11:
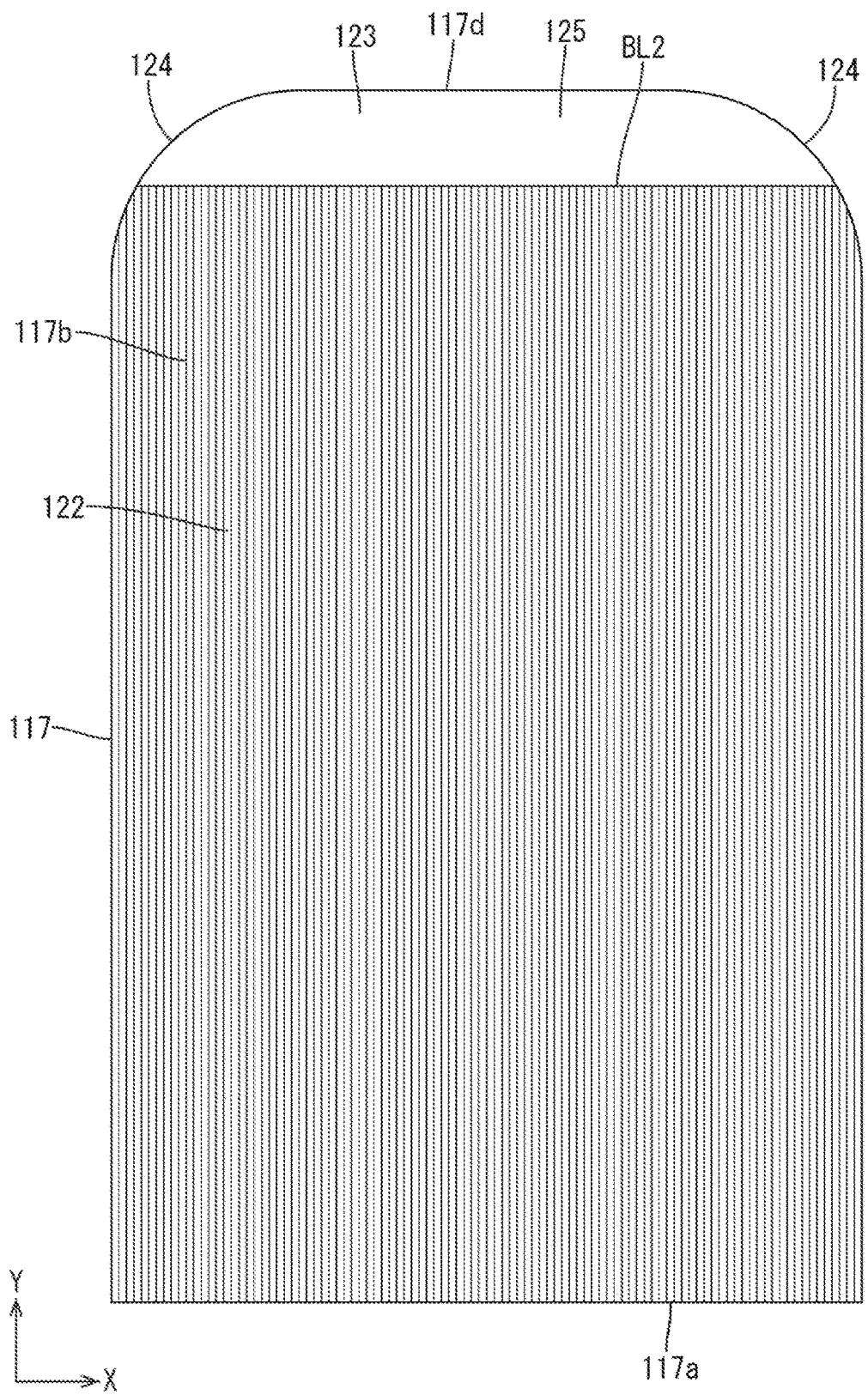
FIG. 11 is a plan view illustrating a backlight device of a liquid crystal display device according to a second embodiment of the present invention.
Figure 12:
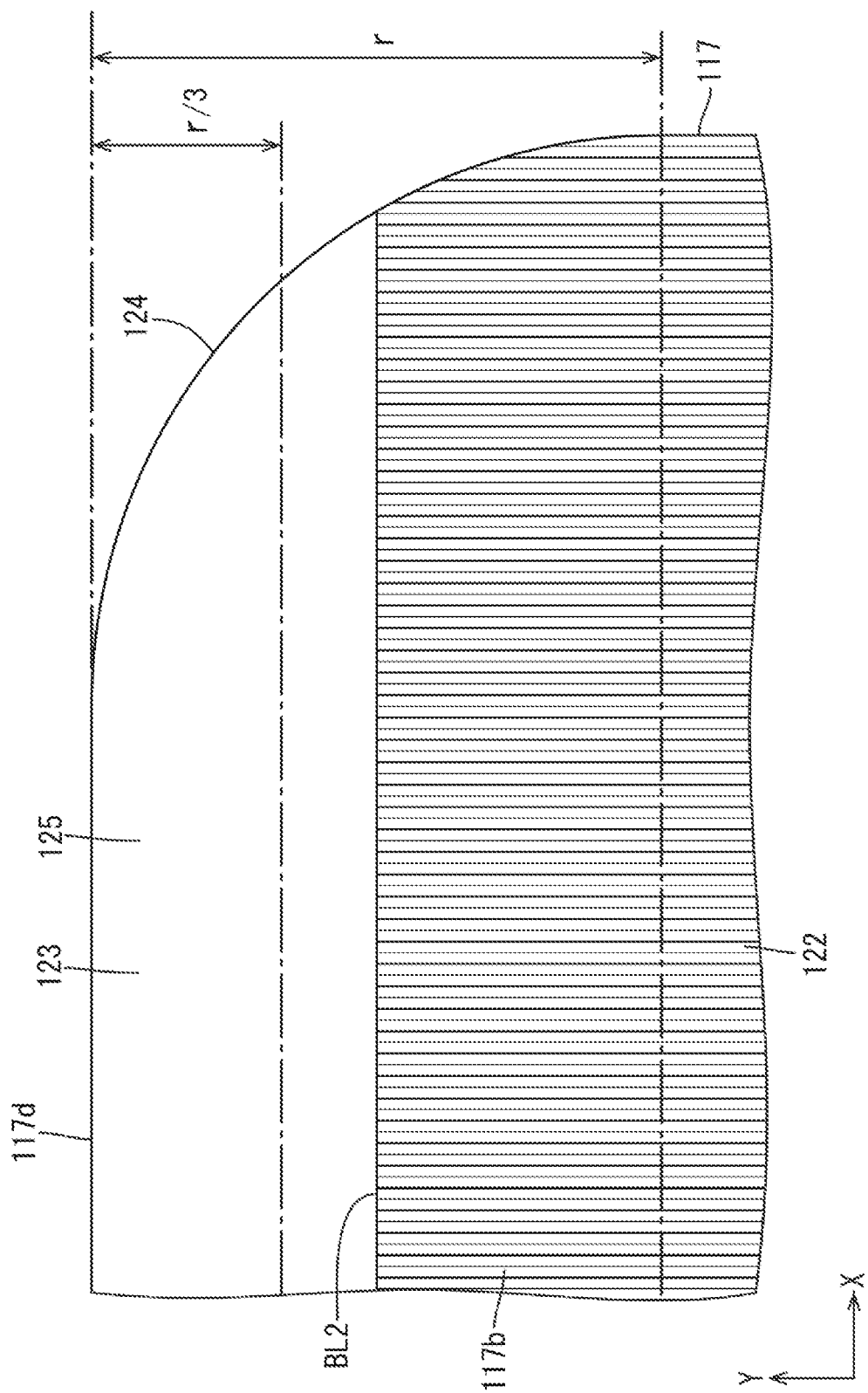
FIG. 12 is a plan view illustrating a portion of the light guide plate included in the backlight device near an opposite edge portion.

As illustrated in FIG. 11, the light collecting portion non-forming section 125 has a belt-like shape having a certain width and extending substantially straight in the X-axis direction (a perpendicular direction perpendicular to a normal direction) in an opposite edge portion 123 of a light guide plate 117. As illustrated in FIG. 12, if a curvature radius of a curved edge surface 124 is referred to as "r", the light collecting portion non-forming section 125 is designed to have an area defined by a distance of "r/3 to r" from an opposite edge surface 117d of the light guide plate 117. In FIG. 12, an area defined by a distance of "r/3" from the opposite edge surface 117d and an area defined by a distance of "r" from the opposite edge surface 117d are illustrated with two-dotted chain lines. Therefore, a border line BL2 between the light collecting portion non-forming section 125 and a light collecting portion 122 is present between the two two-dotted chain lines in FIG. 12 with respect to the Y-axis direction on a light exit plate surface 117b of the opposite edge portion 123. If a light collecting portion non-forming section is smaller than an area defined by the distance of "r/3" from the opposite edge surface 117d of the light guide plate 117, the brightness unevenness caused by the light collecting portion 122 may not be suppressed effectively. If a light collecting portion non-forming section is greater than an area defined by the distance of "r" from the opposite edge surface, the light collecting function of the light collecting portion is lowered and brightness may be lowered. If the light collecting portion non-forming section 125 has an area defined by the distance of "r/3 to r" from the opposite edge surface 117d of the light guide plate 117, occurrence of the brightness unevenness is optimally restricted while keeping brightness in the exiting light rays. The shapes of the light collecting portion non-forming section 125 and the light collecting portion 122 are simplified and design and manufacturing of the light guide plate 117 are easy.

As described before, according to this embodiment, if the curvature radius of the curved edge surface 124 is referred to as "r", the light collecting portion non-forming section 125 is included in the opposite edge portion 123 to have an area defined by the distance of "r/3 to r" from the opposite edge surface 117d of the light guide plate 117 that is opposite from the light entering edge surface 117a. If a light collecting portion non-forming section is smaller than an area defined by the distance of "r/3" from the opposite edge surface 117d of the light guide plate 117, the brightness unevenness caused by the light collecting portion 122 may not be suppressed effectively. If a light collecting portion non-forming section is greater than an area defined by the distance of "r" from the opposite edge surface, the light collecting function of the light collecting portion is lowered and brightness may be lowered. The light collecting portion non-forming section 125 is designed to be in an area defined by the distance of "r/3 to r" from the opposite edge surface 117d of the light guide plate 117, occurrence of the brightness unevenness is optimally restricted while keeping brightness in the exiting light rays. The shapes of the light collecting portion non-forming section 125 and the light collecting portion 122 are simplified and design and manufacturing of the light guide plate 117 are easy.

Third Embodiment

A third embodiment of the present invention will be described with reference to FIG. 13. In the third embodiment, a light collecting portion 222 has a configuration different from that of the second embodiment. The configurations, operations, and effects that are similar to those in the second embodiment will not be described.

Figure 13:
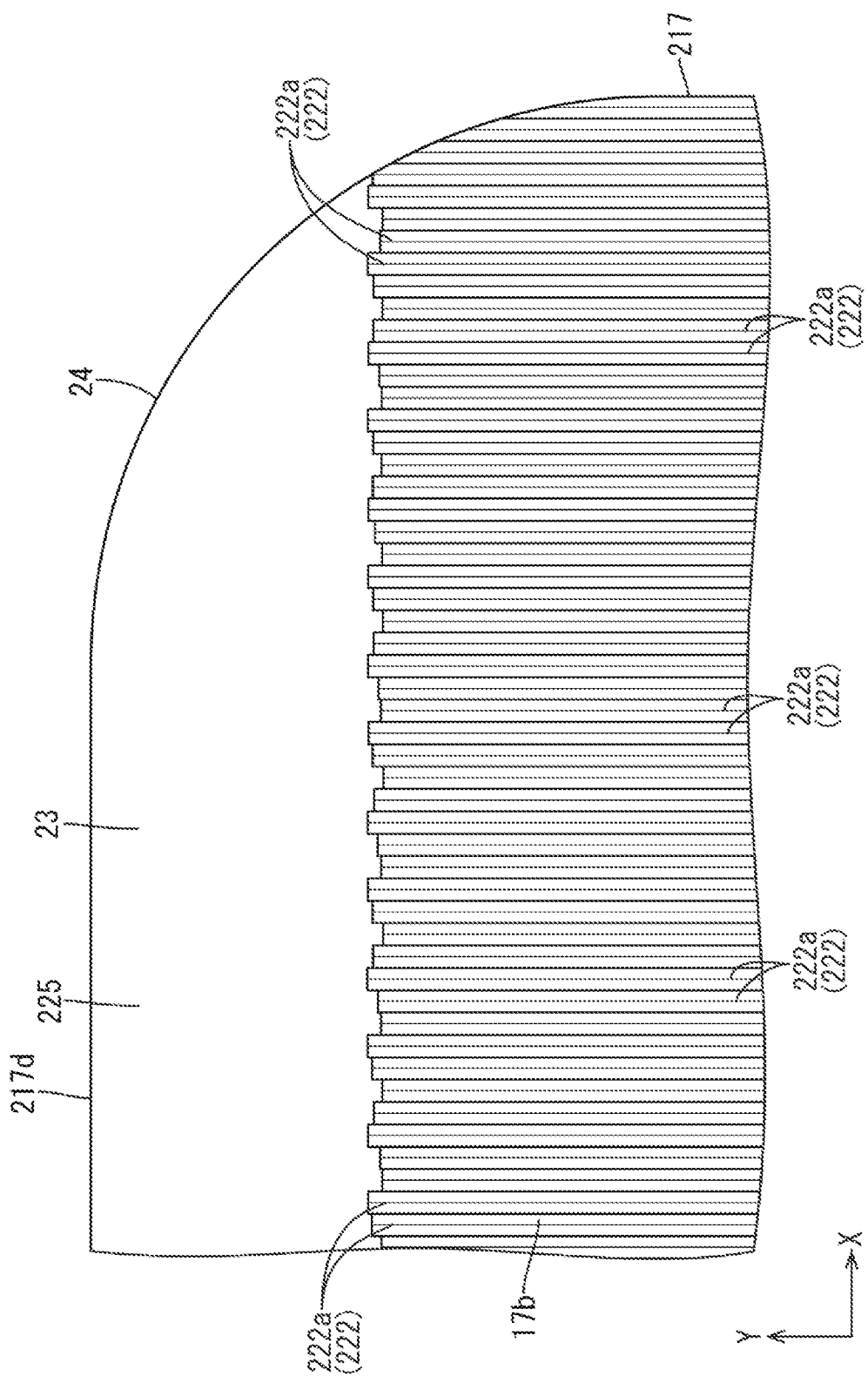
FIG. 13 is a plan view illustrating a vicinity of an opposite edge portion of a backlight device according to a third embodiment of the present invention.

As illustrated in FIG. 13, the light collecting portion 222 of this embodiment is formed such that a border section between the light collecting portion 222 and a light collecting portion non-forming section 225 has a zig-zag shape in a plan view. Specifically, the light collecting portion 222 includes unit light collecting portions 222a having various lengths. The unit light collecting portions 222a adjacent to each other in the X-axis direction have different lengths and the unit light collecting portions 222a having different lengths are arranged at random. According to such a configuration, the border section between the light collecting portion 222 and the light collecting portion non-forming section 225 is less likely to be seen and it is preferable for restricting the brightness unevenness compared to the second embodiment in which the border section between the light collecting portion 122 and the light collecting portion non-forming section 125 is straight in a plan view (refer FIG. 12). The unit light collecting portions 222a of the light collecting portion 222 are arranged such that an average of the distances between edge surfaces thereof near the opposite edge surface 217d with respect to the Y-axis direction and the opposite edge surface 217d of the light guide plate 217 is within a range of "r/3 to r". According to such a configuration, the effects similar to those in the second embodiment can be obtained.

As described before, according to this embodiment, the border section between the light collecting portion 222 and the light collecting portion non-forming section 225 is formed in a zig-zag shape in a plan view. According to such a configuration, compared to a configuration in which the border section of the light collecting portion and the light collecting portion non-forming section is straight in a plan view, the border section between the light collecting portion 222 and the light collecting portion non-forming section 225 is less likely to be seen and it is preferable for restricting the brightness unevenness.

Fourth Embodiment

A fourth embodiment of the present invention will be described with reference to FIG. 14. In the fourth embodiment, a light collecting portion 322 has a configuration different from that of the second embodiment. The configurations, operations, and effects that are similar to those in the second embodiment will not be described.

Figure 14:
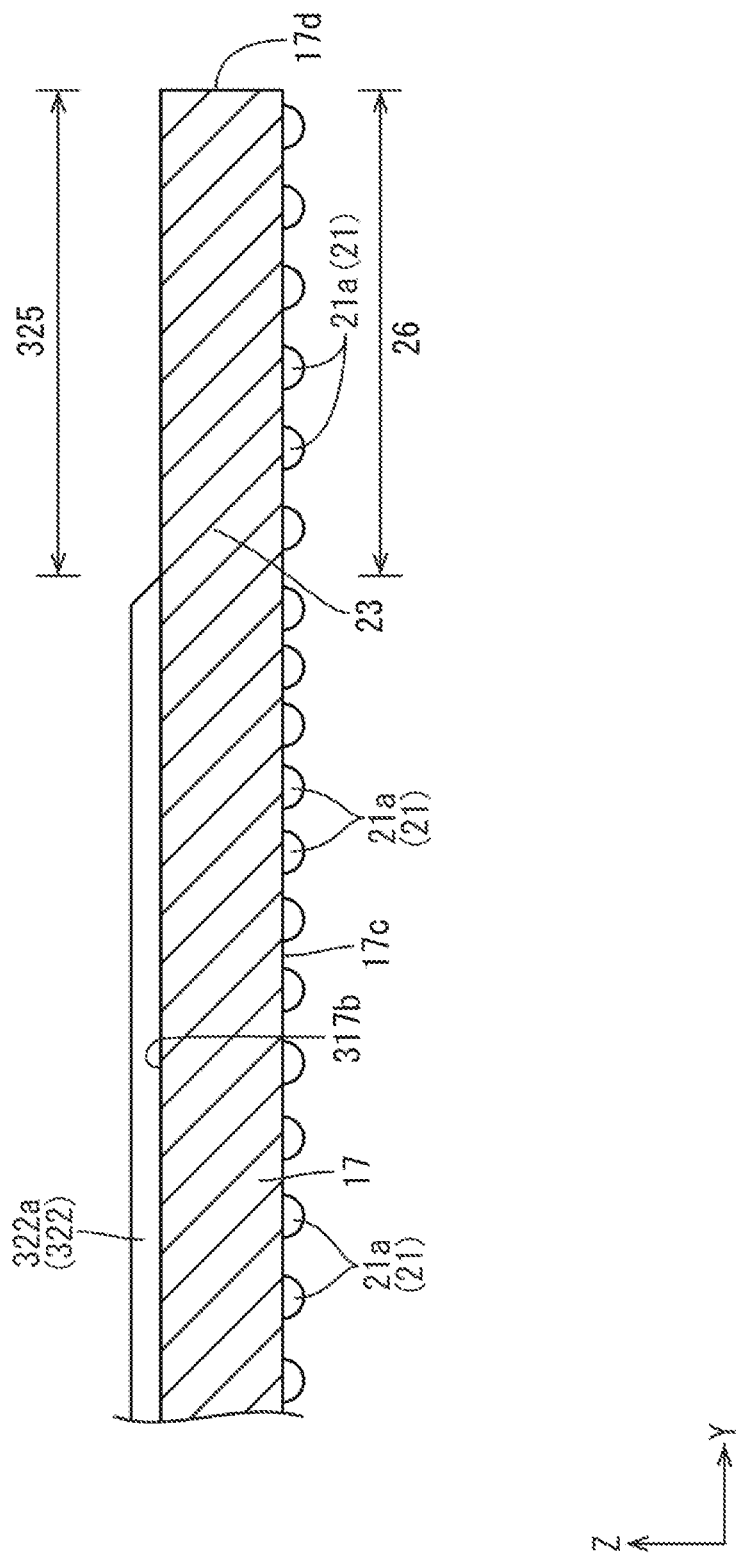
FIG. 14 is a cross-sectional view illustrating the backlight device according to a fourth embodiment of the present invention cut along a long-side direction thereof.

As illustrated in FIG. 14, the light collecting portion 322 according to this embodiment includes unit light collecting portions 322a having a projected height from a light exit plate surface 317b and the projected height of the unit light collecting portions 322a is gradually decreased as the unit light collecting portions 322a extends toward a light collecting portion non-forming section 325. Specifically, each of the unit light collecting portions 322a has a constant projected height from the light exit plate surface 317b in most section thereof in the extending direction. In the end section of each unit light collecting portion 322a near the light collecting portion non-forming section 325, the projected height is continuously and gradually decreased as the unit light collecting portion 322a extends toward the light collecting portion non-forming section 325 and the end section has a sloped cross-sectional shape. According to such a configuration, the border section between the light collecting portion 322 and the light collecting portion non-forming section 325 is less likely to be seen and brightness unevenness is effectively restricted compared to the first to third embodiments in which the projected height of the unit light collecting portion from the light exit plate surface is constant over an entire length thereof (see FIG. 6).

As described before, according to this embodiment, the light collecting portion 322 is formed such that the projected height of the unit light collecting portions 322a is gradually decreased as the unit light collecting portions 322a extends toward a light collecting portion non-forming section 325. According to such a configuration, the border section between the light collecting portion 322 and the light collecting portion non-forming section 325 is less likely to be seen and brightness unevenness is effectively restricted compared to the configuration in which the projected height of the unit light collecting portions from the light exit plate surface is constant over an entire length thereof.

Fifth Embodiment

A fifth embodiment of the present invention will be described with reference to FIG. 15. In the fifth embodiment, a light collecting portion 422 has a configuration different from that of the third embodiment. The configurations, operations, and effects that are similar to those in the third embodiment will not be described.

Figure 15:
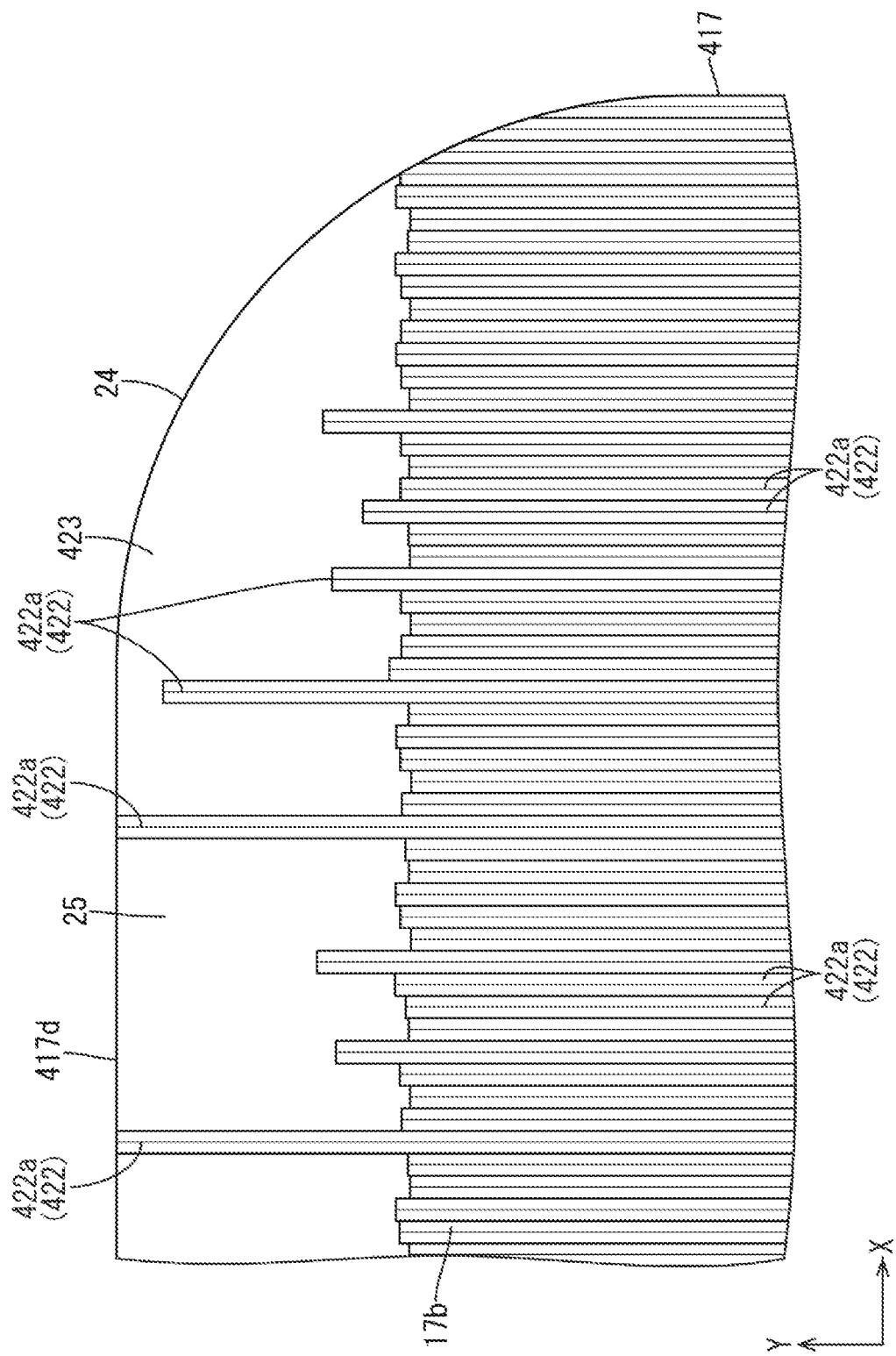
FIG. 15 is a plan view illustrating a backlight device of a liquid crystal display device according to a fifth embodiment of the present invention.

As illustrated in FIG. 15, the light collecting portion 422 includes unit light collecting portions 422a and some of the unit light collecting portions 422a reach an opposite edge surface 417d of a light guide plate 417. Specifically, the light collecting portion 422 includes the unit light collecting portions 422a having various lengths that are arranged at random and some of the unit light collecting portions 422a have a length equal to a long-side dimension of the light guide plate 417 and have edge surfaces that are flash with an opposite edge surface 417d. According to such a configuration, the light rays near the opposite edge surface 417d within the opposite edge portion 423 are accelerated to exit the light guide plate by the ones of the unit light collecting portions 422a reaching the opposite edge surface 417d. Therefore, brightness is improved near the opposite edge surface 417d.

As described before, according to this embodiment, some of the unit light collecting portions 422a included in the light collecting portion 422 reach the opposite edge surface 417d of the light guide plate 417 that is opposite from a light entering edge surface. According to such a configuration, the light rays near the opposite edge surface 417d within the opposite edge portion 423 are accelerated to exit the light guide plate by the ones of the unit light collecting portions 422a extending to the opposite edge surface 417d. Therefore, brightness is improved near the opposite edge surface 417d.

Sixth Embodiment

A sixth embodiment of the present invention will be described with reference to FIGS. 16 and 17. In the sixth embodiment, a forming area of a light collecting portion non-forming section 525 is altered from that in the first embodiment. The configurations, operations, and effects that are similar to those in the first embodiment will not be described.

Figure 16:
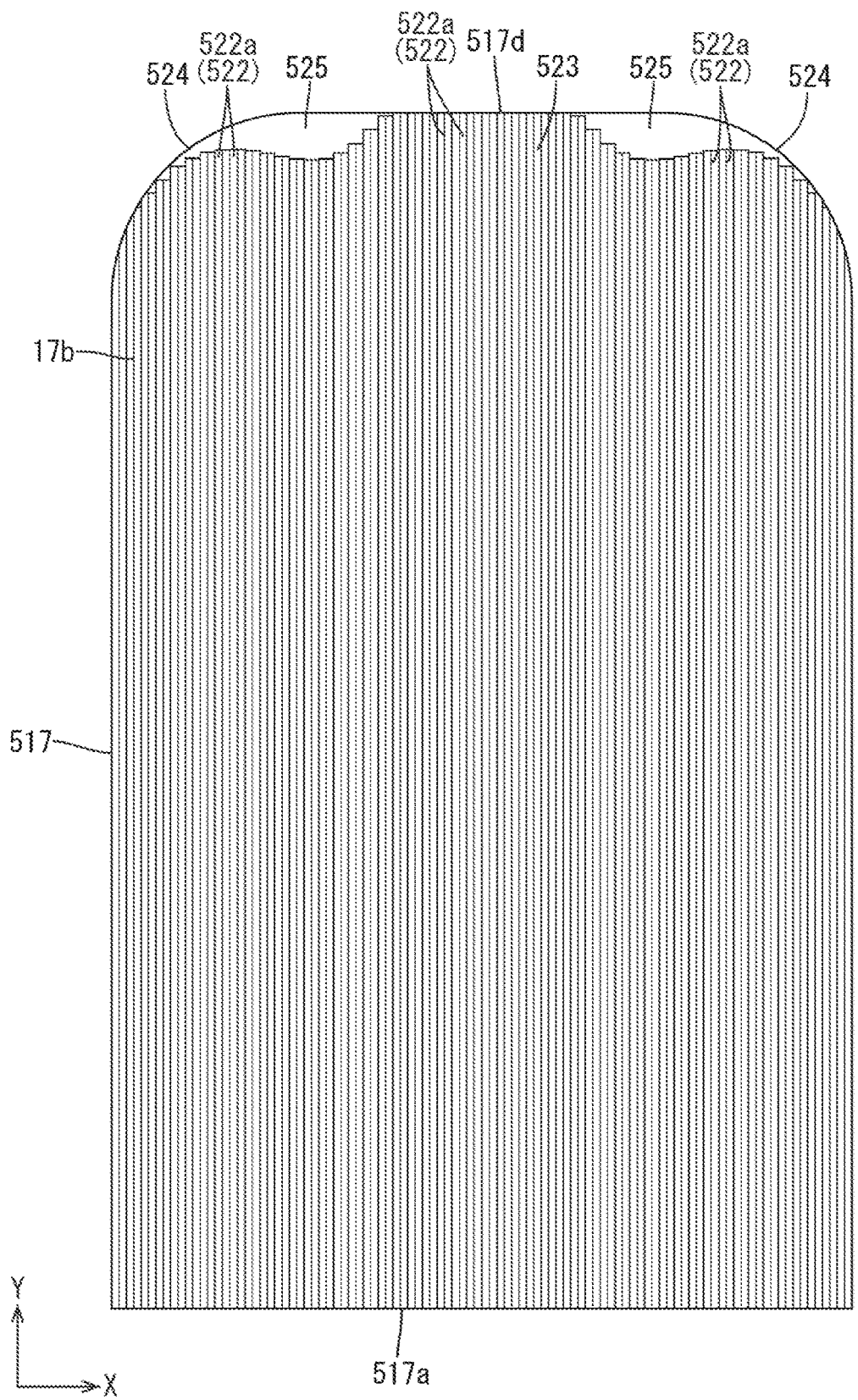
FIG. 16 is a plan view illustrating a part of a light guide plate included in the backlight device near an opposite edge portion.
Figure 17:
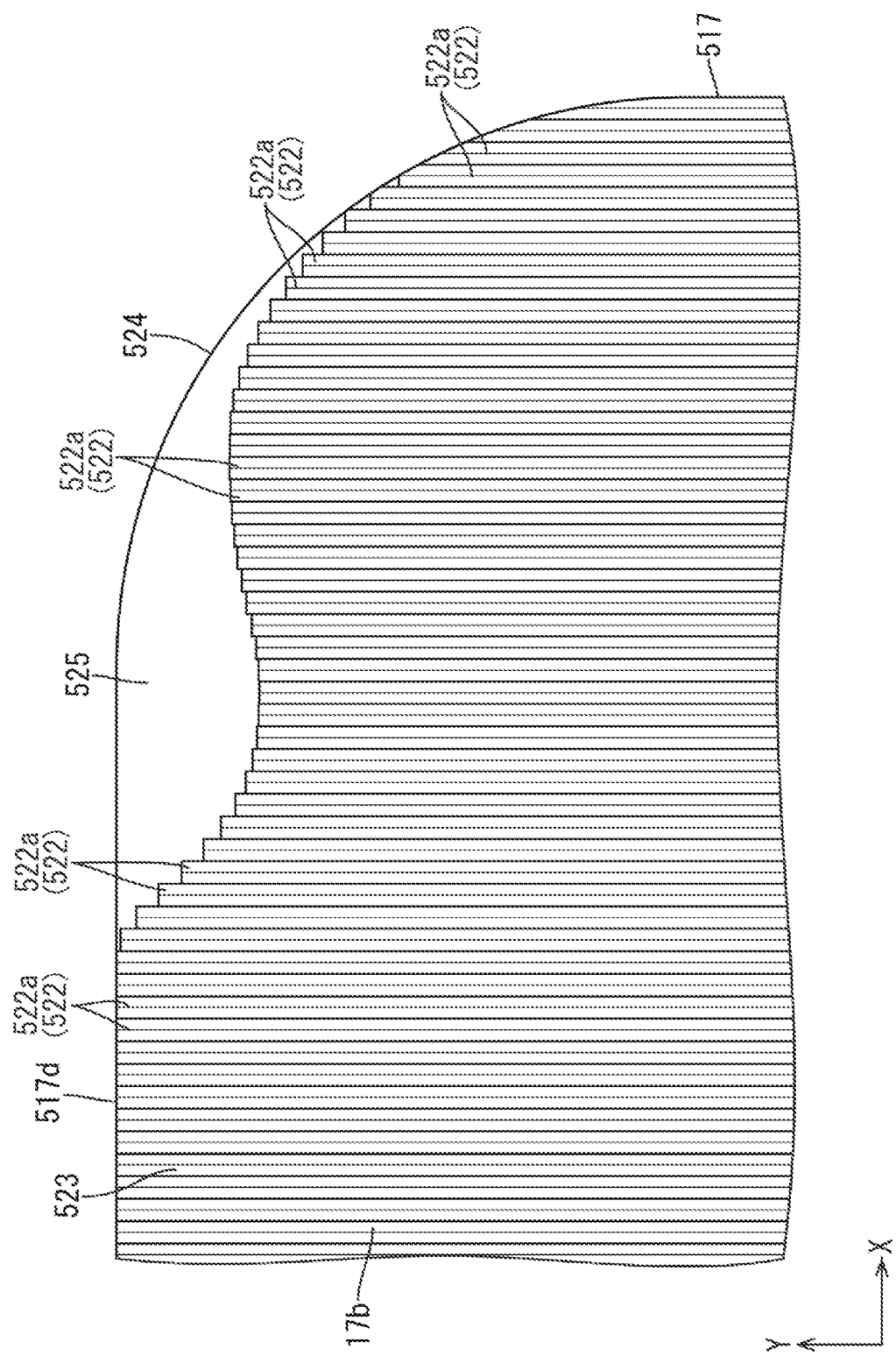
FIG. 17 is a plan view illustrating an opposite edge portion of a light guide plate included in a backlight device according to a sixth embodiment of the present invention.

As illustrated in FIG. 16, an opposite edge portion 523 selectively includes light collecting portion non-forming sections 525 in sections thereof overlapping curved edge surfaces 524 with respect to the X-axis direction (a perpendicular direction perpendicular to a normal direction of a light entering edge surface 517a). Specifically, as illustrated in FIG. 17, the light collecting portion 522 includes unit light collecting portions 522a and some of them that are disposed on a light exit plate surface 517b and at two ends of the opposite edge portion 523 with respect to the X-axis direction and overlapped with curved edge surfaces 524 have a length smaller than a long-side dimension of the light guide plate 517. Some of the unit light collecting portions 522a that are disposed at a middle section with respect to the X-axis direction and are not overlapped with the curved edge surfaces 524 have a length equal to the long-side dimension of the light guide plate 517. According to such a configuration, the two end sections of the opposite edge portion 523 with respect to the X-axis direction having the curved edge surfaces 524 are selectively defined as the light collecting portion non-forming sections 525. According to such a configuration, the light collecting portion 522 is disposed in a larger area in the opposite edge portion 523 compared to the first embodiment including the light collecting portion non-forming section 25 extending over an entire length of the opposite edge portion 23 in the X-axis direction (see FIGS. 4 and 5). Therefore, brightness of the exiting light rays is improved. Sections of the opposite edge portion 523 overlapping the curved edge surfaces 524 with respect to the X-axis direction are selectively defined as the light collecting portion non-forming sections 525 and the brightness unevenness is effectively suppressed.

As described before, according to this embodiment, sections of the opposite edge portion 523 overlapping the curved edge surface 524 with respect to the perpendicular direction are selectively defined as the light collecting portion non-forming sections 525. According to such a configuration, the light collecting portion 522 is disposed in a larger area in the opposite edge portion 523 compared to the configuration including the light collecting portion non-forming area extending over an entire area of the opposite edge portion in the perpendicular direction. Therefore, brightness of the exiting light rays is improved. Sections of the opposite edge portion 523 overlapping the curved edge surfaces 524 with respect to the perpendicular direction are selectively defined as the light collecting portion non-forming sections 525 and the brightness unevenness is effectively suppressed.

Seventh Embodiment

A seventh embodiment of the present invention will be described with reference to FIG. 18. In the seventh embodiment, an outline of a light guide plate 617 differs from that in the second embodiment. The configurations, operations, and effects that are similar to those in the second embodiment will not be described.

Figure 18:
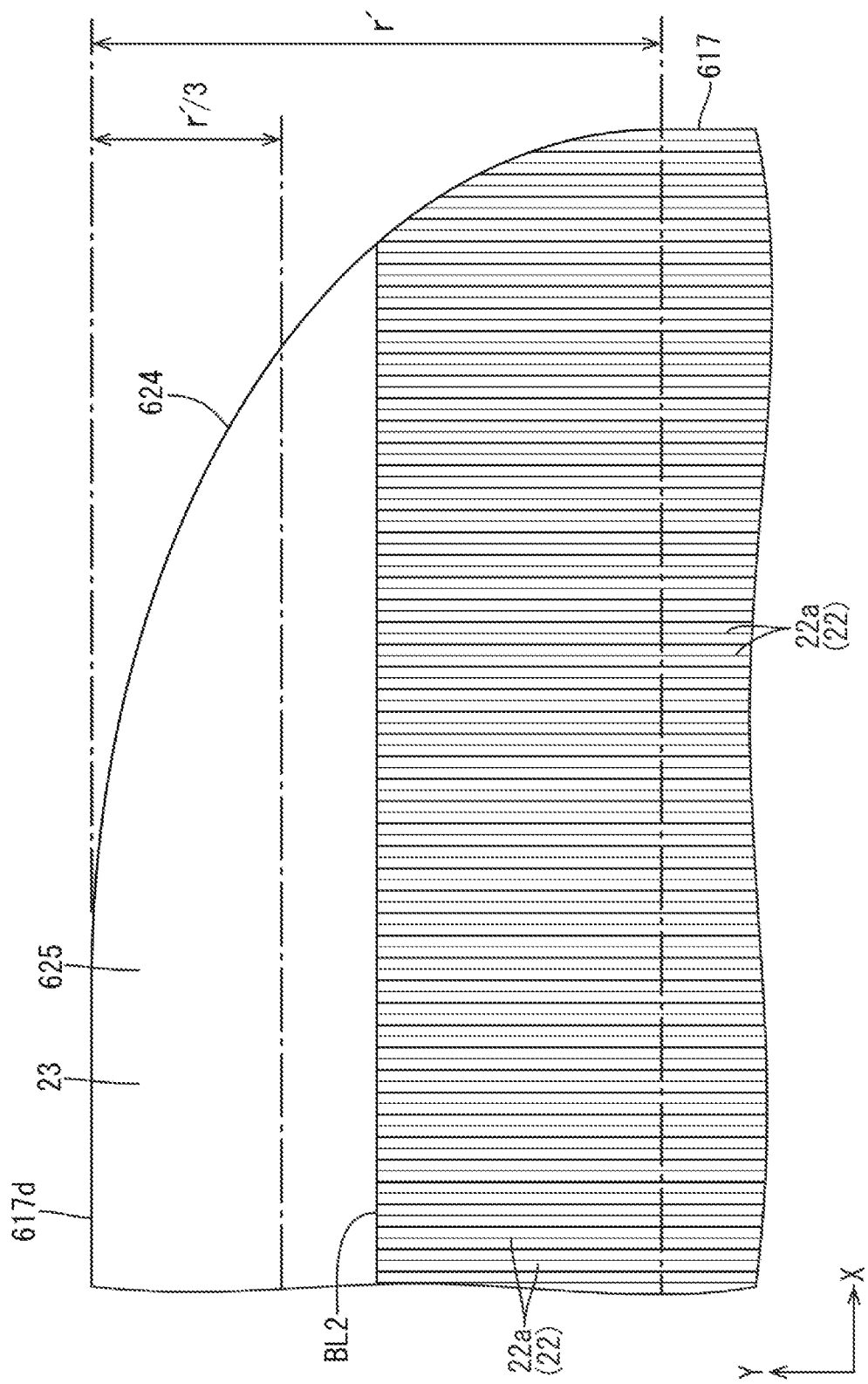
FIG. 18 is a plan view illustrating an opposite edge portion of a light guide plate included in a backlight device according to a seventh embodiment of the present invention.

As illustrated in FIG. 18, the light guide plate 617 according to this embodiment includes the curved edge surfaces 624 having an elongated arched shape in a plan view. Specifically, the curved edge surface 624 has a shape of an elliptic curved arch in a plan view. If the curvature radius of the curved edge surface 624 is referred to as "r'", a light collecting portion non-forming section 625 is designed to have an area defined by a distance of "r'/3 to r'" from an opposite edge surface 617d of the light guide plate 617. In FIG. 18, an area defined by a distance of "r'/3" from the opposite edge surface 617d and an area defined by a distance of "r'" from the opposite edge surface 617d are illustrated with two-dotted chain lines. According to this embodiment, effects similar to those in the second embodiment are obtained.

Other Embodiments

The present invention is not limited to the embodiments, which have been described using the foregoing descriptions and the drawings. For example, embodiments described below are also included in the technical scope of the present invention.

Figure 19:
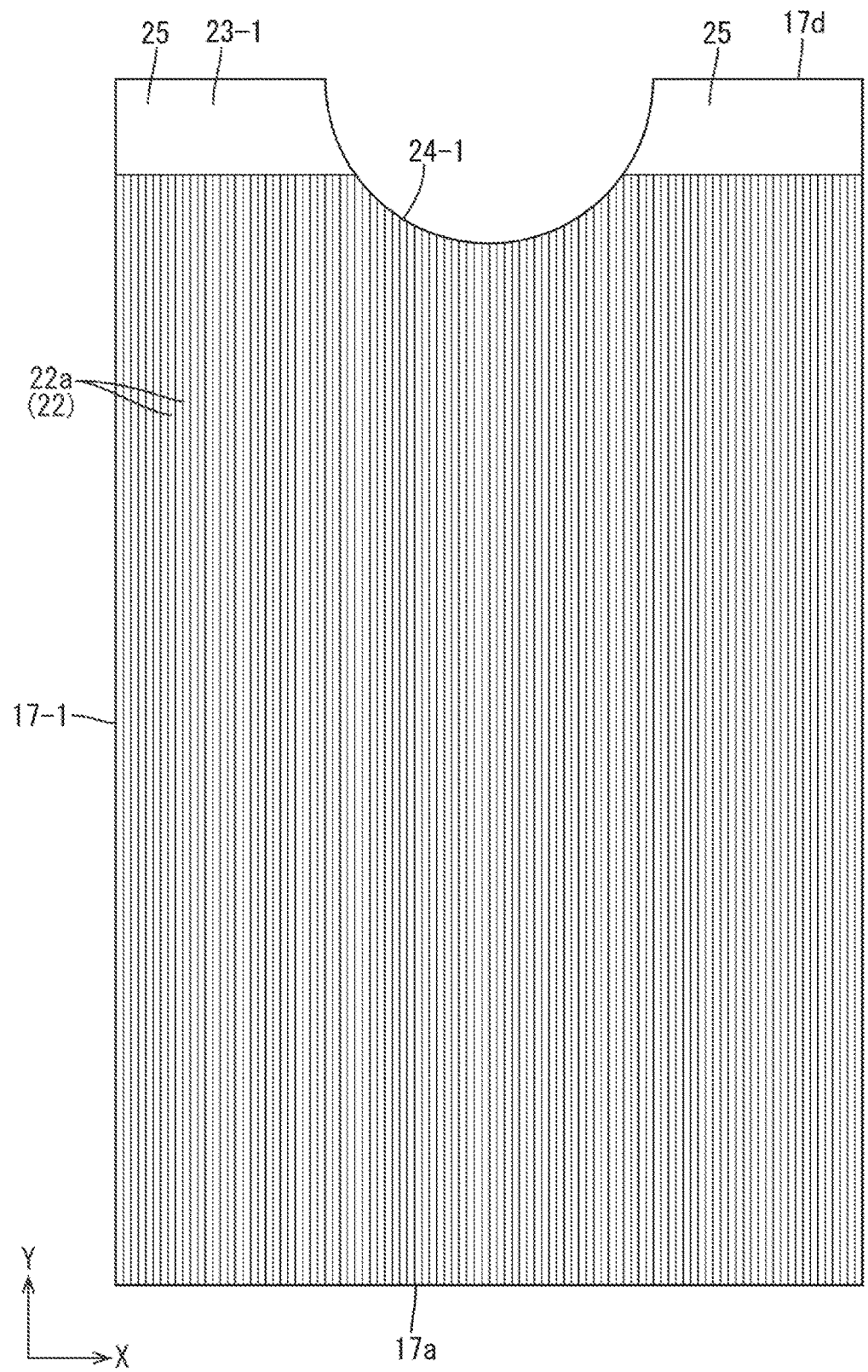
FIG. 19 is a plan view illustrating a backlight device of a liquid crystal display device according to other embodiment (1) of the present invention.

(1) Other than each of the above embodiments, the outline of the light guide plate may be altered. For example, as illustrated in FIG. 19, a light guide plate 17-1 may include a curved edge surface 24-1 at a middle section of an opposite edge portion 23-1 with respect to the X-axis direction (the perpendicular direction).

Figure 20:
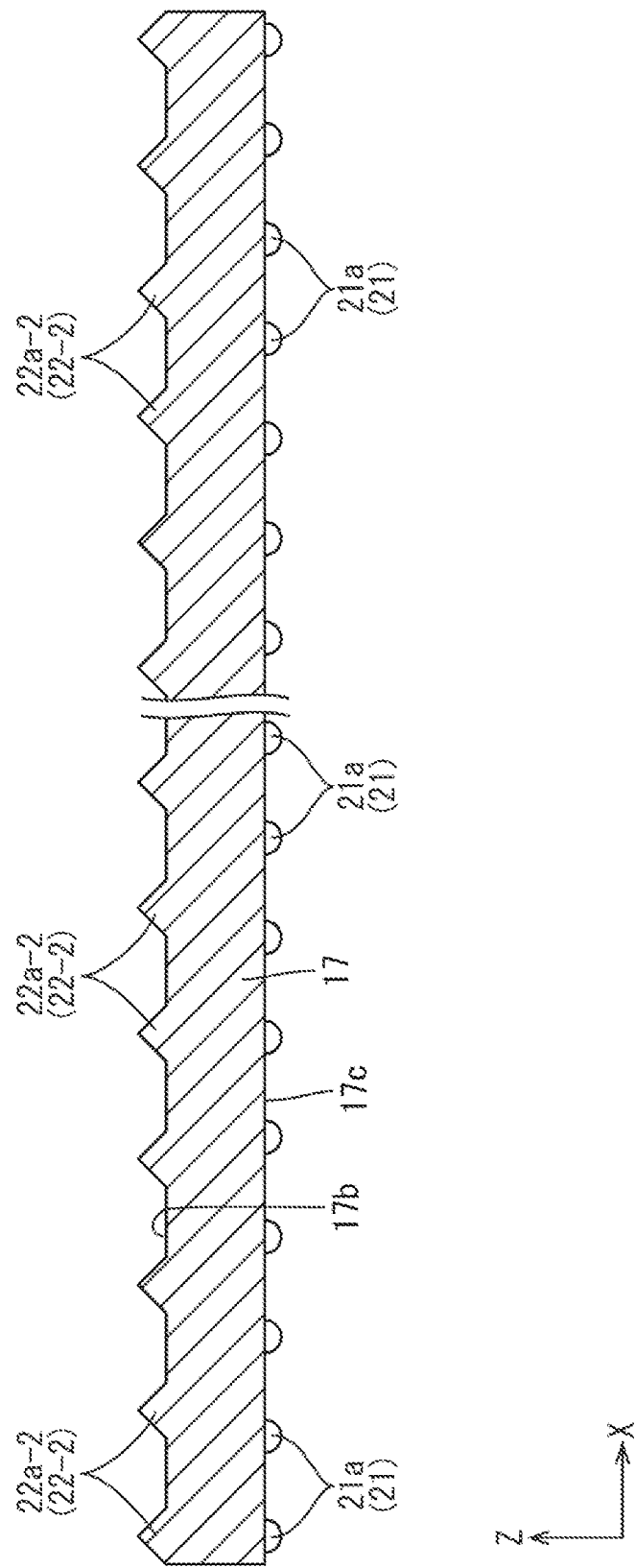
FIG. 20 is a cross-sectional view illustrating a backlight device according to other embodiment (2) of the present invention taken along a short-side direction thereof.

(2) Other than each of the above embodiments, a specific configuration of the light collecting portion may be altered as appropriate. For example, as illustrated in FIG. 20, unit light collecting portions 22a-2 of a light collecting portion 22-2 may be arranged at intervals with respect to the X-axis direction (the perpendicular direction) such that flat sections are present between adjacent unit light collecting portions 22a-2.

Figure 21:
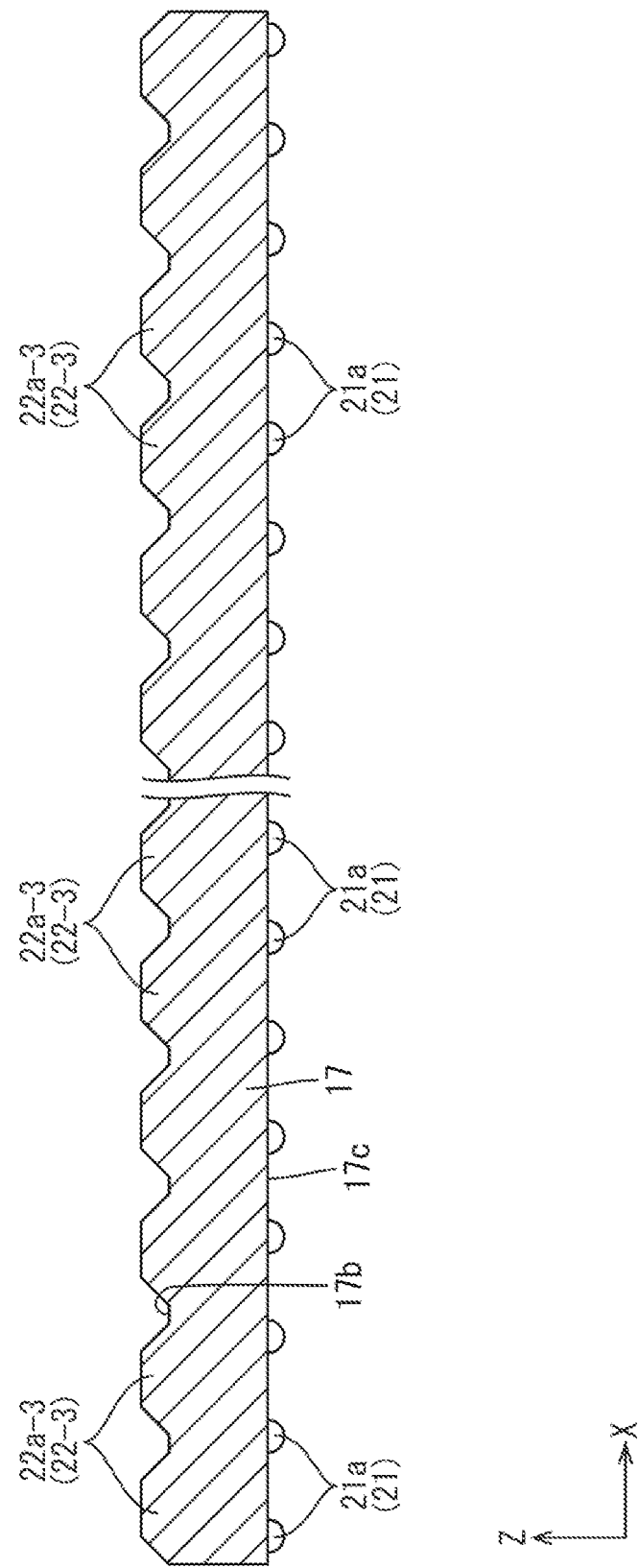
FIG. 21 is a cross-sectional view illustrating a backlight device according to other embodiment (3) of the present invention taken along a short-side direction thereof.

(3) Other than each of the above embodiments, a specific configuration of the light collecting portion may be altered as appropriate. For example, as illustrated in FIG. 21, unit light collecting portions 33a-3 of a light collecting portion 22-3 may have a trapezoidal cross-sectional shape.

Figure 22:
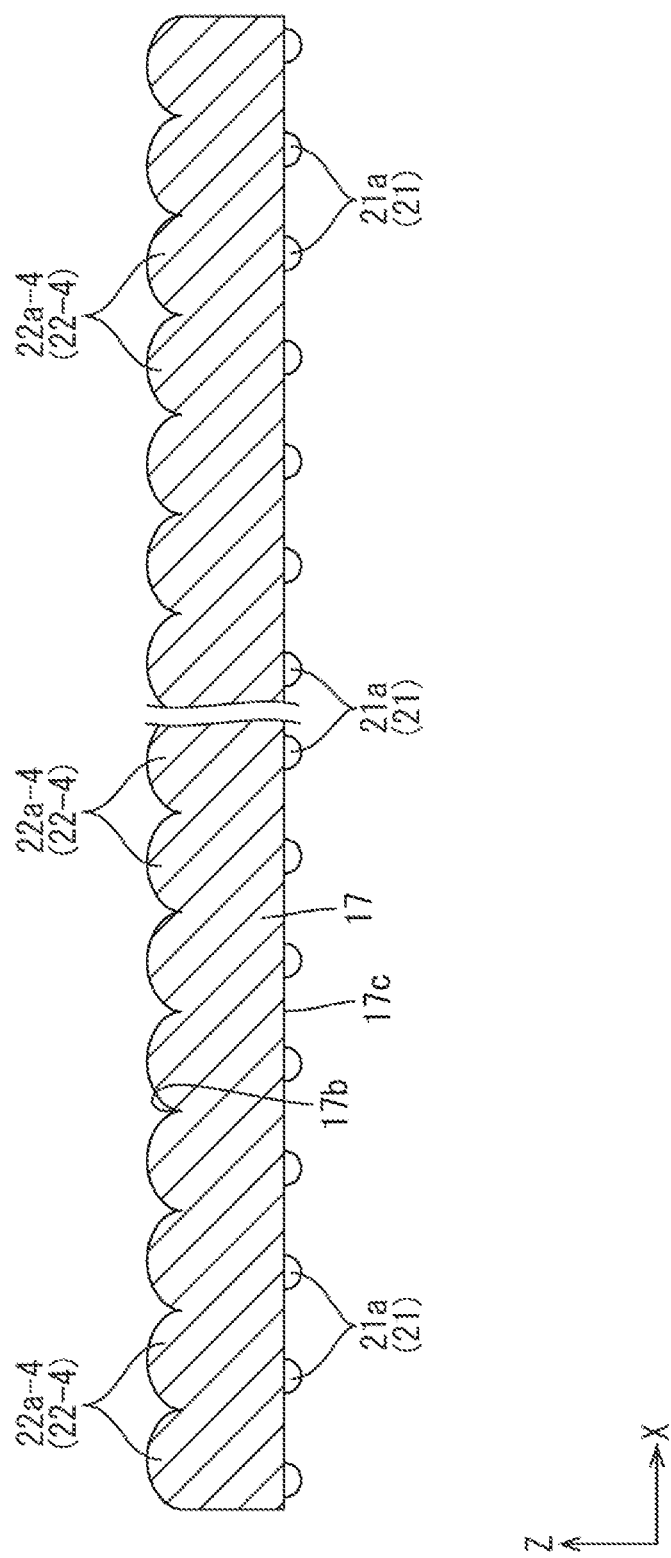
FIG. 22 is a cross-sectional view illustrating a backlight device according to other embodiment (4) of the present invention taken along a short-side direction thereof.

(4) Other than each of the above embodiments, a specific configuration of the light collecting portion may be altered as appropriate. For example, as illustrated in FIG. 22, unit light collecting portions 22a-4 of a light collecting portion 22-4 may have a semi-circular cross-sectional shape (may be a lenticular lens).

(5) In each of the above embodiments, the curved edge surface has an arched shape of a curved line of a perfect circle or an ellipsoidal shape. However, the curved edge surface may be apart of free curved line.

(6) In each of the above embodiments, the curved edge surface has a central angle of about 90°. However, the central angle of the curved edge surface may have a central angle greater than 90° or smaller than 90°. A specific value of a curvature radius of the curved edge surface may be altered as appropriate.

(7) Other than each of the above embodiments illustrated in the drawings, a specific area ratio of the curved edge surface and the entire edge surface area of the opposite edge portion may be altered as appropriate.

(8) In each of the above embodiments, a part of the edge surface of the opposite edge portion is the curved edge surface. However, an entire area of the edge surface of the opposite edge portion may be the curved edge surface.

(9) In each of the above embodiments, a part of the opposite edge portion is the light collecting portion non-forming section. However, an entire area of the opposite edge portion may be the light collecting portion non-forming section. The light collecting portion non-forming section may extend to be larger than the opposite edge portion (in a portion of the light guide plate not including the curved edge surface with respect to the normal direction of the light entering edge surface).

(10) Other than each of the above embodiments illustrated in the drawings, the specific area ratio of the light collecting portion non-forming area to the opposite edge portion may be altered as appropriate.

(11) In each of the above embodiments, the area ratio of the less exit light reflection section and the light guide plate is equal to the area ratio of the light collecting portion non-forming section and the light guide plate and the less exit light reflection section and the light collecting portion non-forming section are overlapped with each other. However, the area ratio of the less exit light reflection section and the light guide plate may be equal to the area ratio of the light collecting portion non-forming section and the light guide plate and the less exit light reflection section and the light collecting portion non-forming section may be partially overlapped with each other. Other than that, an entire area of one of the less exit light reflection section and the light collecting portion non-forming section may overlap the other one and the area ratios thereof may be different from each other. Furthermore, the less exit light reflection section and the light collecting portion non-forming section may partially overlap each other and the area ratios thereof may be different from each other.

(12) In each of the above embodiments, the light guide plate includes the less exit light reflection section on the opposite plate surface. However, the less exit light reflection section may not be included.

(13) Other than each of the above embodiments, the specific material used for the light guide plate may be altered as appropriate. If the material of the light guide plate is altered, a critical angle of the light guide plate with respect to air is changed according to the refractive index of the material. Accordingly, the specific design of the light collecting portion non-forming section in the opposite edge portion may be preferably altered such as using the method described in the first embodiment.

(14) In each of the above embodiments (except for other embodiment (1)), the light guide plate has the curved edge surfaces at the pair of corners in the opposite edge portion. However, the light guide plate may have a curved edge surface at one of the pair of corners in the opposite edge portion.

(15) Each of the above embodiments other than other embodiment (1) may be combined with other embodiment (1) and the light guide plate may include three curved edge surfaces. The light guide plate may include four curved edge surfaces or more.

(16) Other than the second and seventh embodiments, the specific area of the light collecting portion non-forming section may be altered as appropriate. However, the area is preferably defined by a distance of "r/3 to r" from the opposite edge surface.

(17) In the third and fifth embodiments, the unit light collecting portions having various lengths are arranged at random. However, the unit light collecting portions having various lengths may be regularly arranged in a cycle. Other than the third and fifth embodiments, the specific arrangement of the unit light collecting portions may be altered as appropriate.

(18) Other than the fourth embodiment illustrated in the drawing, the specific area of the sloped surface in the unit light collecting portion may be altered as appropriate.

(19) Other than the sixth embodiment illustrated in the drawing, the specific arrangement of the unit light collecting portions may be altered as appropriate.

(20) Other than the seventh embodiment, a section of the elliptic curved arch that is to be formed in the curved edge surface may be altered as appropriate.

(21) The technical matters described in each of the above embodiments may be combined as appropriate.

(22) In each of the above embodiments, the unit light exit portions included in the exit light reflection portion are printed on the light exit opposite plate surface of the light guide plate. However, the unit light exit portions may be formed on the light exit opposite plate surface of the light guide plate with a vapor deposition method. A part of the light exit opposite plate surface of the light guide plate may be partially recessed to form the unit light exit portions. In such a configuration, a shape of a molding die may be transferred when the light guide plate is molded with resin or the light exit opposite plate surface of the light guide plate may be processed with cutting.

(23) Other than each of the above embodiments, the specific number and the specific type of the optical sheet used in the backlight device may be altered as appropriate.

(24) Other than each of the above embodiments, the reflection sheet covering the light exit opposite plate surface of the light guide plate may not be included.

(25) Other than each of the above embodiments, the number of the LEDs mounted on the LED board may be altered as appropriate.

(26) In each of the above embodiments, the LEDs of a side surface light emitting type are used. However, LEDs of a top surface light emitting type may be used. Light sources other than the LEDs (such as organic EL) may be used.

(27) In each of the above embodiments, the liquid crystal display device including the liquid crystal panel as the display panel is included. However, a MEMS display device including a display panel of micro electro mechanical systems (MEMS) as the display panel may be included in the scope of the present invention.

(28) In each of the above embodiments, the unit light collecting portions of the light collecting portion project from the light exit plate surface. However, the unit light collecting portions of the light collecting portion may be formed to be recessed on the light exit plate surface. Especially, if the light collecting portion including the recessed unit light collecting portions is included in the fourth embodiment, a recessed depth of the unit collecting portions from the light exit plate surface may be gradually smaller as the unit collecting portion extends toward the light collecting portion non-forming section.

EXPLANATION OF SYMBOLS

10: liquid crystal display device (display device), 11: liquid crystal panel (display panel), 12: backlight device (lighting device), 15: LED (light source), 17, 17-1, 117, 217, 417, 517, 617: light guide plate, 17a, 117a, 517a: light entering edge surface, 17b, 117b, 317b: light exit plate surface, 17c: light exit opposite plate surface, 17d, 117d, 217d, 417d, 517d, 617d: opposite edge surface, 21: exit light reflection portion, 21a: unit reflection portion, 22, 22-2, 22-3, 22-4, 122, 222, 322, 422, 522: light collecting portion, 22a, 22a-2, 22a-3, 22a-4, 222a, 322a, 422a, 522a: unit light collecting portion, 23, 23-1, 423, 523: opposite edge portion, 24, 24-1, 124, 524, 624: curved edge surface, 25, 125, 225, 325, 525, 625: light collecting portion non-forming section, 26: less exit light reflection section, L: line, O: original point

The invention claimed is:

1. A lighting device comprising: a light source; a light guide plate including a light entering edge surface that is opposite to the light source and through which light enters and including a pair of plate surfaces one of which is a light exit plate surface through which the light exits; and a light collecting portion including unit light collecting portions that extend in a normal direction to the light entering edge surface on the light exit plate surface and are arranged in a perpendicular direction that is perpendicular to the normal direction, wherein the light guide plate further includes an opposite edge portion that is opposite from an end portion thereof including the light entering edge surface, the opposite edge portion includes an edge surface, wherein corner portions of the edge surface include a curved edge surface and a central portion of the opposite edge surface is flat, and the opposite edge portion includes the light exit plate surface, a portion of which is a light collecting portion non-forming section on which no light collecting portion is located, the curved edge surface of the opposite edge portion has an arched planar shape with a radius, the radius of the curved edge surface is referred to as "r", a critical angle of the light guide plate with respect to air is referred to as "0", a center of curvature of the curved edge surface is referred to as an original point, orthogonal coordinates have a Y-axis passing through the original point and parallel to the normal direction and a X-axis passing through the original point and parallel to the perpendicular direction, a line is obtained such that an intercept is "r-sine-(1-tan(90"-2e)" and inclination is "tan (90"-20)", and an area defined by the line is the light collecting portion non-forming section of the opposite edge portion.

2. A lighting device comprising: a light source; a light guide plate including a light entering edge surface that is opposite to the light source and through which light enters and including a pair of plate surfaces one of which is a light exit plate surface through which the light exits; and a light collecting portion including unit light collecting portions that extend in a normal direction to the light entering edge surface on the light exit plate surface and are arranged in a perpendicular direction that is perpendicular to the normal direction, wherein the light guide plate further includes an opposite edge portion that is opposite from an end portion thereof including the light entering edge surface, the opposite edge portion includes an edge surface, wherein corner portions of the edge surface include a curved edge surface and a central portion of the edge surface is flat, and the opposite edge portion includes the light exit plate surface, a portion of which is a light collecting portion non-forming section on which no light collecting portion is located, the curved edge surface of the opposite edge portion has an arched planar shape with a radius, the radius of the curved edge surface is referred to as "r", and the light collecting portion non-forming section is included in the opposite edge portion in an area defined by a distance of "r/3 to r" from an opposite edge surface of the light guide plate opposite from the light entering edge surface.

3. The lighting device according to claim 1, wherein the light collecting portion is disposed such that a border section between the light collecting portion and the light collecting portion non-forming section is formed in a zig-zag shape in a plan view.

4. The lighting device according to claim 3, wherein some of the unit collecting portions of the light collecting portion reach an opposite edge surface of the light guide plate opposite from the light entering edge surface.

5. The lighting device according to claim 1, wherein the unit light collecting portions of the light collecting portion project from the light exit plate surface with a projected height and the light collecting portion is formed such that the projected height is decreased as the unit light collecting portions extend toward the light collecting portion non-forming section.

6. The lighting device according to claim 1, wherein the opposite edge portion includes the light collecting portion non-forming section in a section overlapping the curved edge surface with respect to the perpendicular direction.

7. The lighting device according to claim 1, wherein
other one of the pair of the plate surfaces of the light guide plate is an opposite plate surface and the light guide plate includes an exit light reflection portion on the opposite plate surface and the exit light reflection portion includes unit reflection portions that reflect the light and direct the light to exit through the light exit plate surface, and the light exit opposite plate surface of the opposite edge portion includes a section overlapping the light collecting portion non-forming section and the section is a less exit light reflection section in which a distribution density of the unit reflection portions is lower and is less reflective than a section corresponding to the light collecting portion.

8. A display device comprising:
the lighting device according to claim 1; and
a display panel displaying images using the light from the lighting device.

9. A lighting device comprising:
a light source;
a light guide plate including a light entering edge surface that is opposite to the light source and through which light enters and including a pair of plate surfaces one of which is a light exit plate surface through which the light exits; and
a light collecting portion including unit light collecting portions that extend in a normal direction to the light entering edge surface on the light exit plate surface and are arranged in a perpendicular direction that is perpendicular to the normal direction, wherein
the light guide plate further includes an opposite edge portion that is opposite from an end portion thereof including the light entering edge surface, the opposite edge portion includes an edge surface, a portion of which is a curved edge surface having a curved planar shape, and the opposite edge portion includes the light exit plate surface, a portion of which is a light collecting portion non-forming section on which no light collecting portion is located, and
the light collecting portion is disposed such that a border section between the light collecting portion and the light collecting portion non-forming section is defined in a zig-zag shape in a plan view.

10. The lighting device according to claim 9, wherein some of the unit collecting portions of the light collecting portion reach an opposite edge surface of the light guide plate opposite from the light entering edge surface.

11. A lighting device comprising:
a light source;
a light guide plate including a light entering edge surface that is opposite to the light source and through which light enters and including a pair of plate surfaces one of which is a light exit plate surface through which the light exits; and
a light collecting portion including unit light collecting portions that extend in a normal direction to the light entering edge surface on the light exit plate surface and are arranged in a perpendicular direction that is perpendicular to the normal direction, wherein
the light guide plate further includes an opposite edge portion that is opposite from an end portion thereof including the light entering edge surface, the opposite edge portion includes an edge surface, a portion of which is a curved edge surface having a curved planar shape, and the opposite edge portion includes the light exit plate surface, a portion of which is a light collecting portion non-forming section on which no light collecting portion is located, and
the unit light collecting portions of the light collecting portion project from the light exit plate surface with a projected height and the light collecting portion is defined such that the projected height is decreased as the unit light collecting portions extend toward the light collecting portion non-forming section.

12. A lighting device comprising:
a light source;
a light guide plate including a light entering edge surface that is opposite to the light source and through which light enters and including a pair of plate surfaces one of which is a light exit plate surface through which the light exits; and
a light collecting portion including unit light collecting portions that extend in a normal direction to the light entering edge surface on the light exit plate surface and are arranged in a perpendicular direction that is perpendicular to the normal direction, wherein
the light guide plate further includes an opposite edge portion that is opposite from an end portion thereof including the light entering edge surface, the opposite edge portion includes an edge surface, a portion of which is a curved edge surface having a curved planar shape, and the opposite edge portion includes the light exit plate surface, a portion of which is a light collecting portion non-forming section on which no light collecting portion is located,
other one of the pair of the plate surfaces of the light guide plate is an opposite plate surface and the light guide plate further includes an exit light reflection portion on the opposite plate surface and the exit light reflection portion includes unit reflection portions that reflect the light and direct the light to exit through the light exit plate surface, and
the light exit opposite plate surface of the opposite edge portion includes a section overlapping the light collecting portion non-forming section and the section is a less exit light reflection section in which a distribution density of the unit reflection portions is lower and is less reflective than a section corresponding to the light collecting portion.

* * * * *